(12) United States Patent
Kawano

(10) Patent No.: US 11,391,944 B2
(45) Date of Patent: Jul. 19, 2022

(54) INFORMATION PROCESSING DEVICE, INFORMATION PROCESSING METHOD, AND PROGRAM

(71) Applicant: SONY CORPORATION, Tokyo (JP)

(72) Inventor: Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 307 days.

(21) Appl. No.: 16/479,820

(22) PCT Filed: Dec. 22, 2017

(86) PCT No.: PCT/JP2017/046112
§ 371 (c)(1),
(2) Date: Jul. 22, 2019

(87) PCT Pub. No.: WO2018/173399
PCT Pub. Date: Sep. 27, 2018

(65) Prior Publication Data
US 2021/0349309 A1    Nov. 11, 2021

(30) Foreign Application Priority Data

Mar. 21, 2017 (JP) .............................. JP2017-054198

(51) Int. Cl.
*G02B 27/00* (2006.01)
*G02B 27/01* (2006.01)
(Continued)

(52) U.S. Cl.
CPC ....... *G02B 27/0093* (2013.01); *G02B 27/017* (2013.01); *G06F 3/011* (2013.01);
(Continued)

(58) Field of Classification Search
CPC .... G02B 27/0093; G02B 27/017; G06F 3/011
See application file for complete search history.

(56) References Cited

U.S. PATENT DOCUMENTS 5,900,849 A * 5/1999 Gallery ................ G02B 27/017
345/8
2013/0328928 A1* 12/2013 Yamagishi .............. A63F 13/25
345/633
(Continued)

FOREIGN PATENT DOCUMENTS

JP    H10-504917 A    5/1998
JP    2002-132241 A    5/2002
(Continued)

*Primary Examiner* — Mark Edwards
*Assistant Examiner* — Chayce R Bibbee
(74) *Attorney, Agent, or Firm* — Paratus Law Group, PLLC

(57) ABSTRACT

The present disclosure proposes an information processing device, an information processing method and a program, which are capable of, while virtual reality content is displayed, informing a user of positional relationship between the user and a boundary region of a space in which the user can act in the real space. The information processing device comprising: an obtaining unit that obtains body information of a user; and an output control unit that, while virtual reality content is displayed by a display unit, causes a sign indicating positional relationship between the user and a boundary region of a second real space in which the user can act in a first real space in which the user is located, the boundary region having been determined on the basis of the body information of the user, to be displayed with the sign superimposed on the content.

20 Claims, 21 Drawing Sheets

(51) Int. Cl.
*G06F 3/01* (2006.01)
*G06V 40/10* (2022.01)

(52) U.S. Cl.
CPC .... *G06V 40/107* (2022.01); *G02B 2027/0167* (2013.01); *G02B 2027/0187* (2013.01)

(56) References Cited

U.S. PATENT DOCUMENTS

2016/0124502 A1* 5/2016 Sawyer ................ G02B 27/017
345/633
2016/0282618 A1* 9/2016 Kon ..................... G02B 27/017

FOREIGN PATENT DOCUMENTS

| | | |
|---|---|---|
| JP | 2007-049219 A | 2/2007 |
| JP | 2008-292168 A | 12/2008 |
| JP | 2013-257716 A | 12/2013 |
| JP | 2015-118332 A | 6/2015 |
| JP | 2017-535901 A | 11/2017 |
| WO | WO 2016/073783 A1 | 5/2016 |

\* cited by examiner

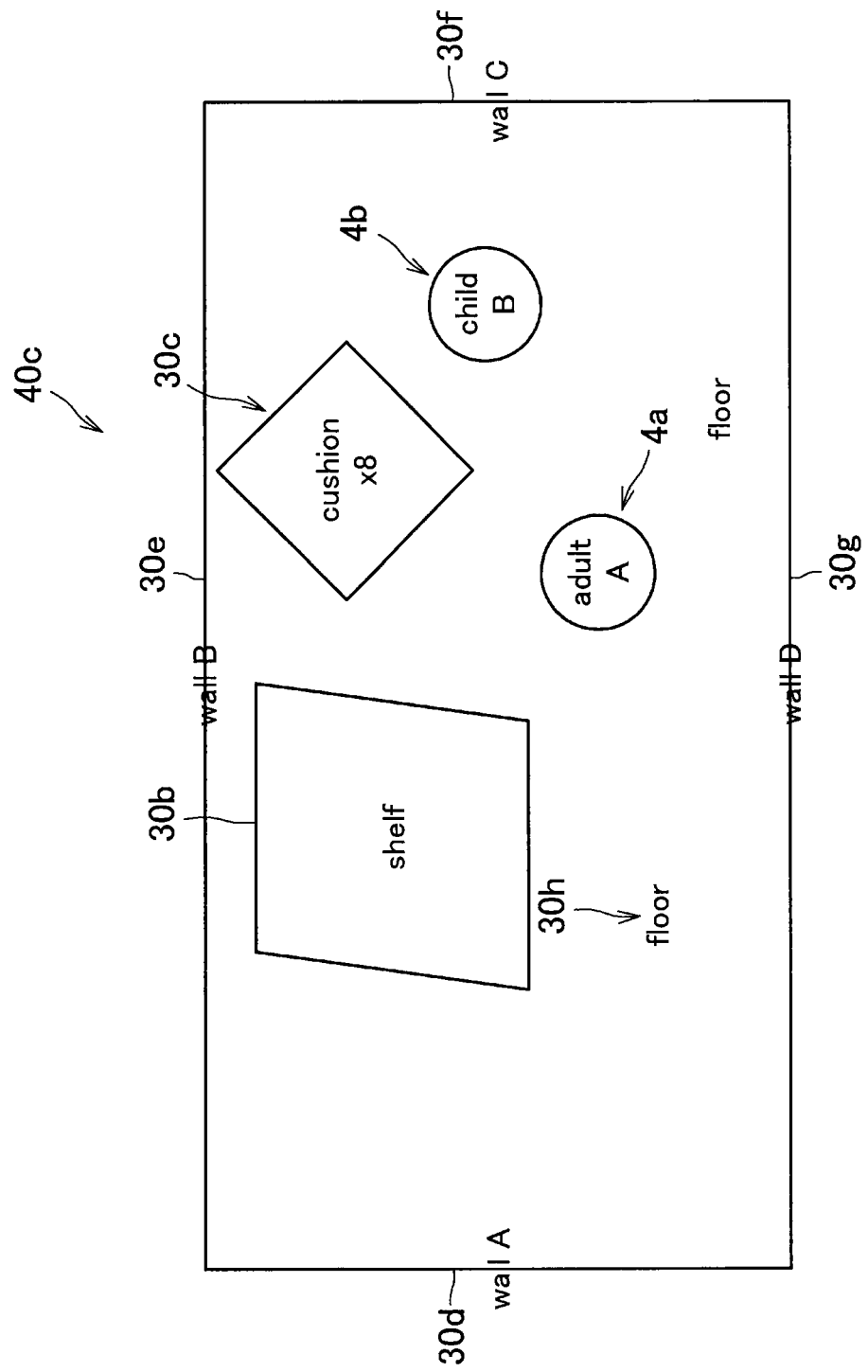

FIG. 6

| 420 | 422 | 424 | 426 |
|---|---|---|---|
| KIND OF CONTENT | DEGREE OF DANGER AT THE TIME OF COMING IN CONTACT WITH ANOTHER USER | USER'S MOVEMENT ASSUMED INFORMATION | THE NUMBER OF USERS WHO ARE CONCURRENTLY USING CONTENT |
| DETECTIVE PROBLEM-SOLVING GAME | SAFE IF MOVEMENT IS SLOW | · USER'S ARMS AND HEAD MOVE<br>· ONE OR MORE MOVEMENTS OCCUR EVERY ABOUT TEN MINUTES<br>· HANDS MOVE SLOWLY<br>· USER MOVE BACK AND FORTH AND AROUND WITHIN A 50cm RADIUS OF USER | 2 |

| KIND OF OBJECT 440 | DIRECTION RELATIVE TO USER 442 | DISTANCE FROM USER 444 | MATERIAL 446 | HARDNESS 448 |
|---|---|---|---|---|
| CUSHION | FRONT, RIGHT 10 TO 40 DEGREES | 30cm | CLOTH | SOFT |
| HUMAN B | FRONT, RIGHT 30 TO 50 DEGREES | 40cm | HUMAN | ORDINARY |
| SHELF | FRONT, RIGHT 10 TO 80 DEGREES | 40cm | WOOD, IRON | HARD |
| CEILING | FRONT, UP 70 TO 90 DEGREES | 150cm | WOOD | HARD |
| FLOOR | FRONT, DOWN 70 TO 90 DEGREES | 100cm | STONE | HARD |
| WALL A | LEFT, CENTER −45 TO 45 DEGREES | 150cm | WOOD | HARD |
| WALL B | FRONT, CENTER −10 TO 10 DEGREES | 150cm | WOOD | HARD |
| WALL C | RIGHT, CENTER −45 TO 45 DEGREES | 150cm | WOOD | HARD |
| WALL D | BACK, CENTER −45 TO 45 DEGREES | 150cm | WOOD | HARD |

44

| ID | NAME | AGE | HEIGHT | ARM'S LENGTH | EXCITEMENT DEGREE (0 TO 100) | EXTERNAL APPEARANCE INFORMATION | MUSCLE STRENGTH |
|---|---|---|---|---|---|---|---|
| 0001 | A | 40 | 192cm | 80cm | 80 | WEAR PROTECTOR | STRONG |
| 0002 | B | 7 | 122cm | 50cm | 50 | WEAR PROTECTOR | WEAK |

| KIND OF OBJECT | POSSIBILITY OF CONTACT | WHETHER OBJECT IS DANGER OR NOT |
|---|---|---|
| CUSHION | POSSIBLE | SAFE |
| HUMAN B | POSSIBLE | MOST DANGEROUS |
| SHELF | POSSIBLE | DANGEROUS |
| CEILING | NOT POSSIBLE | MOST SAFE |
| FLOOR | POSSIBLE | SAFE |
| WALL A | NOT POSSIBLE | MOST SAFE |
| WALL B | NOT POSSIBLE | MOST SAFE |
| WALL C | NOT POSSIBLE | MOST SAFE |
| WALL D | NOT POSSIBLE | MOST SAFE |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/046112 (filed on Dec. 22, 2017) under 35 U.S.C. § 371, which claims priority to Japanese Patent Application No. 2017-054198 (filed on Mar. 21, 2017), which are all hereby incorporated by reference in their entirety.

TECHNICAL FIELD

The present disclosure relates to an information processing device, an information processing method, and a program.

BACKGROUND ART

Conventionally, various kinds of technologies related to Virtual Reality (VR) are developed. In the VR, a user can view a video image generated by a computer with high realistic sensation.

For example, the undermentioned patent document 1 discloses the technology in which while a VR image is displayed in a display unit, displaying of the VR image is stopped according to an importance level of an event that has occurred in the actual world.

CITATION LIST

Patent Document

Patent Document 1: Japanese Patent Application Laid-Open No. 2015-118332

SUMMARY OF THE INVENTION

Problems to be Solved by the Invention

However, in the technology described in the patent document 1, while a VR image is displayed in a display unit, it was difficult for a user to grasp a range of a space in which the user can act in the actual world.

Accordingly, the present disclosure proposes an information processing device, an information processing method and a program, which are novel and improved, and are capable of, while virtual reality content is displayed, informing a user of positional relationship between the user and a boundary region of a space in which the user can act in the real space.

Solutions to Problems

According to the present disclosure, there is provided an information processing device provided with: an obtaining unit that obtains body information of a user; and an output control unit that, while virtual reality content is displayed by a display unit, causes a sign indicating positional relationship between the user and a boundary region of a second real space in which the user can act in a first real space in which the user is located, the boundary region having been determined on the basis of the body information of the user, to be displayed with the sign superimposed on the content.

In addition, according to the present disclosure, there is provided an information processing method that includes: obtaining body information of a user; and while virtual reality content is displayed by a display unit, causing, by a processor, a sign indicating positional relationship between the user and a boundary region of a second real space in which the user can act in a first real space in which the user is located, the boundary region having been determined on the basis of the body information of the user, to be displayed with the sign superimposed on the content.

Moreover, according to the present disclosure, there is provided a program causing a computer to function as: an obtaining unit that obtains body information of a user; and an output control unit that, while virtual reality content is displayed by a display unit, causes a sign indicating positional relationship between the user and a boundary region of a second real space in which the user can act in a first real space in which the user is located, the boundary region having been determined on the basis of the body information of the user, to be displayed with the sign superimposed on the content.

Effects of the Invention

As described above, according to the present disclosure, while virtual reality content is displayed, a user can be informed of positional relationship between the user and a boundary region of a space in which the user can act in the real space. It should be noted that the effects described herein are not necessarily limited, and may be any one of the effects described in the present disclosure.

BRIEF DESCRIPTION OF DRAWINGS

FIG. 5 is a drawing illustrating an example of a distance image measured by a distance sensor installed on a ceiling of a room 2.

FIG. 6 is a drawing illustrating an example of content information.

FIG. 9 is a drawing illustrating an example of information related to each individual object in a room 2.

FIG. 12 is a drawing illustrating, as an example, a result of deciding a degree of danger related to each individual object shown in FIG. 9.

FIG. 13 is an explanatory drawing illustrating an example of determining a range of a movable space 60a corresponding to a user 4a.

MODE FOR CARRYING OUT THE INVENTION

Figure 1:
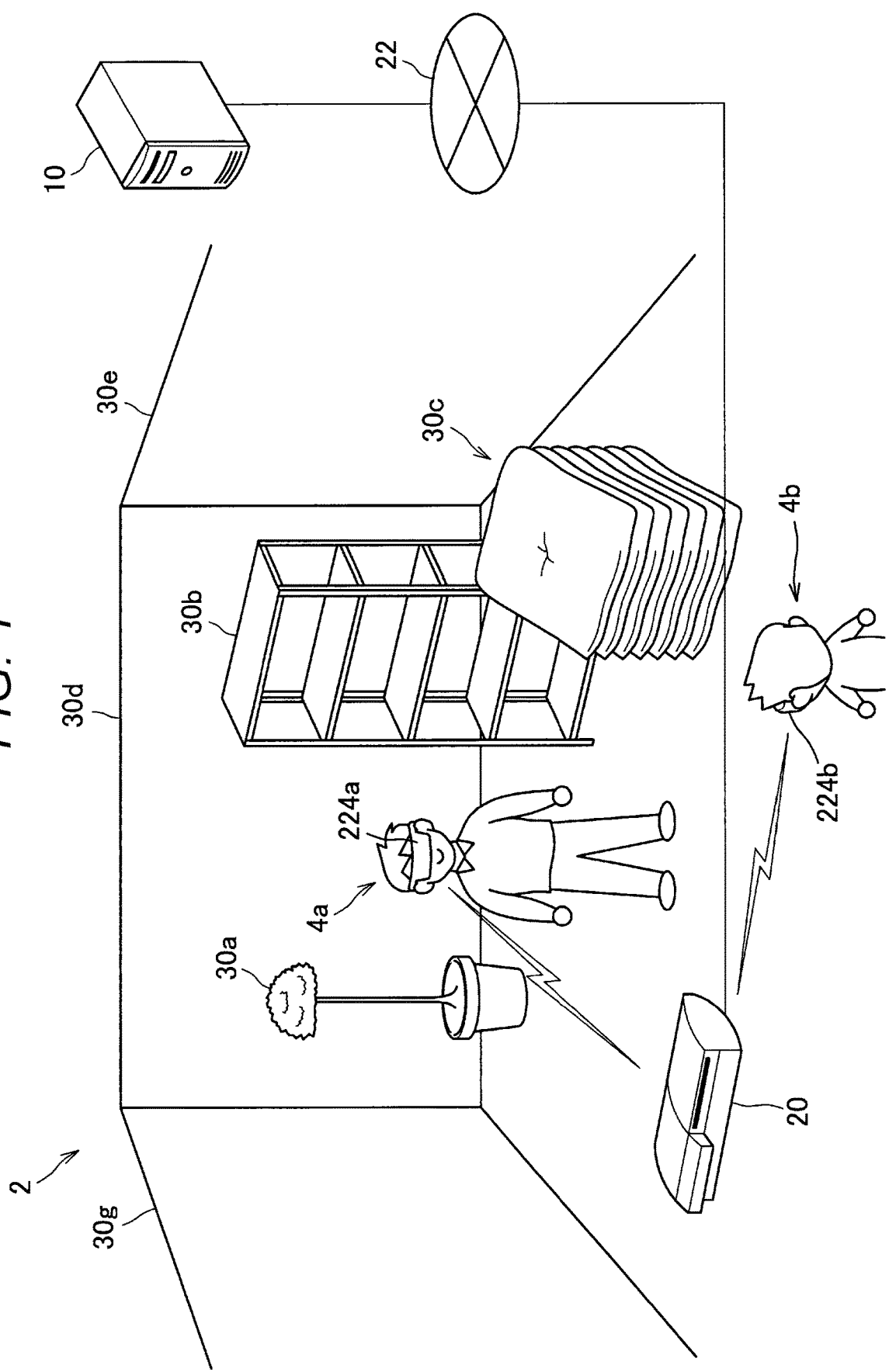
FIG. 1 is an explanatory drawing illustrating a configuration example of an information processing system according to an embodiment of the present disclosure.

Preferred embodiments of the present disclosure will be detailed below with reference to the accompanying drawings. It should be noted that in the present description and the drawings, components having substantially identical functional configurations are provided with identical reference numbers, and duplicate explanation thereof will be omitted.

In addition, in the present description and the drawings, there is also a case where a plurality of components each having a substantially identical functional configuration is distinguished by different alphabets added to the last part of an identical reference numeral. For example, a plurality of components each having a substantially identical functional configuration is distinguished as follows: a client terminal 20a, and a client terminal 20b as necessary. However, in a case where it is not particularly necessary to distinguish a plurality of components each having a substantially identical functional configuration, only the identical reference numeral is used. For example, in a case where it is not particularly necessary to distinguish between the client terminal 20a and the client terminal 20b, the client terminal 20a and the client terminal 20b are merely referred to as the client terminal 20.

In addition, the "mode for carrying out the invention" will be described according to the order of items shown below.
1. Configuration of information processing system
2. Detailed explanation of embodiments
3. Hardware configuration
4. Modified example

1. CONFIGURATION OF INFORMATION PROCESSING SYSTEM

First of all, a configuration example of an information processing system according to the embodiment of the present disclosure will be described with reference to FIG. 1. As shown in FIG. 1, the information processing system according to the present embodiment includes a server 10, a client terminal 20, and a communication network 22.

<1-1. Client Terminal 20>

The client terminal 20 is a device that controls, for example, displaying of content such as VR content. As shown in, for example, FIG. 1, each user 4 in a room 2 can wear a display unit 224. In this case, the client terminal 20 causes the display unit 224 to display VR content. It should be noted that the client terminal 20 may be arranged in the room 2, or may be arranged in a place in which the client terminal 20 is capable of wiredly or wirelessly communicating with the display unit 224, the place being spaced away from the room 2.

In addition, the display unit 224 can be a head-wearing type device (for example, a wearable device such as a Head Mounted Display (HMD)) such as that shown in FIG. 1.

Incidentally, in a scene in which the user 4 wears the display unit 224 to use the VR content, a visual field of the user 4 is usually covered by the VR content. Therefore, the user 4 cannot see the outer world (in other words, a real space in which the user 4 is located). Therefore, there is, for example, a risk of coming in contact with an object without noticing the existence of the object located in the real space while the user 4 uses (for example, views) the VR content, or the like. Accordingly, as described later, the server 10 according to the present embodiment is capable of determining a range of a movable space in which the user 4 can securely move in the real space in which the user 4 is located, and is capable of notifying the user 4 of a boundary region of the movable space. This enables the user 4 to securely use the VP content.

Here, the real space (for example, the inside of the room 2) in which the user 4 is located is an example of a first real space in the present disclosure. In addition, the movable space is an example of a second real space in the present disclosure.

1-1-1. Functional Configuration

Figure 2:
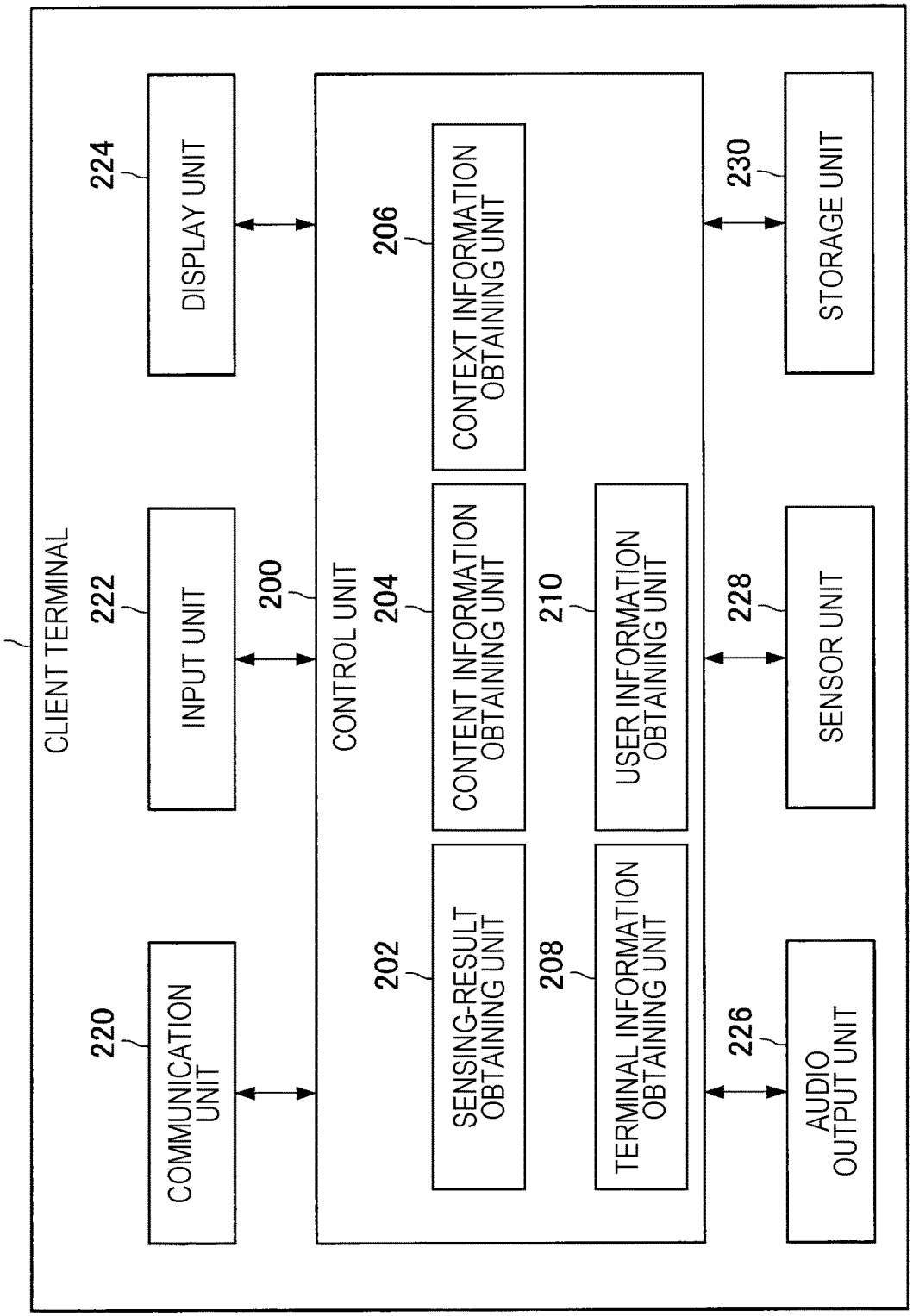
FIG. 2 is a functional block diagram illustrating a functional configuration example of a client terminal 20 according to the embodiment.

Here, an example of a functional configuration of the client terminal 20 will be described with reference to FIG. 2. As shown in FIG. 2, the client terminal 20 includes a control unit 200, a communication unit 220, an input unit 222, a display unit 224, an audio output unit 226, a sensor unit 228, and a storage unit 230. It should be noted that the present disclosure is not limited to such an example. One or more of the input unit 222, the display unit 224, the audio output unit 226 and the sensor unit 228 may be configured as another device that is capable of communicating with the client terminal 20 instead of being included in the client terminal 20.

1-1-1-1. Sensor Unit 228

The sensor unit 228 can include a camera (image sensor). In addition, the sensor unit. 228 can include, for example, a distance sensor (for example, a stereo camera, a depth sensor, etc.) for measuring a distance from the user. In addition, the sensor unit 228 may further include an acceleration sensor, a gyro sensor, a thermometer, a perspiration sensor, a living-body sensor (for measuring, for example, pulsation or the like), and/or a microphone.

Incidentally, at least one kind of sensor (for example, the distance sensor, the acceleration sensor, etc.) included in the sensor unit 228 can be mounted by an individual user. In addition, the at least one sensor may be configured as a device that is integral with the display unit. 224, or may be another wearing type apparatus that is separated from the display unit 224.

Moreover, at least one kind of sensor (for example, a camera, a distance sensor, etc.) included in the sensor unit 228 may be not only mounted by an individual user, but also separately arranged in the room 2 (for example, a ceiling, etc.).

Figure 3:
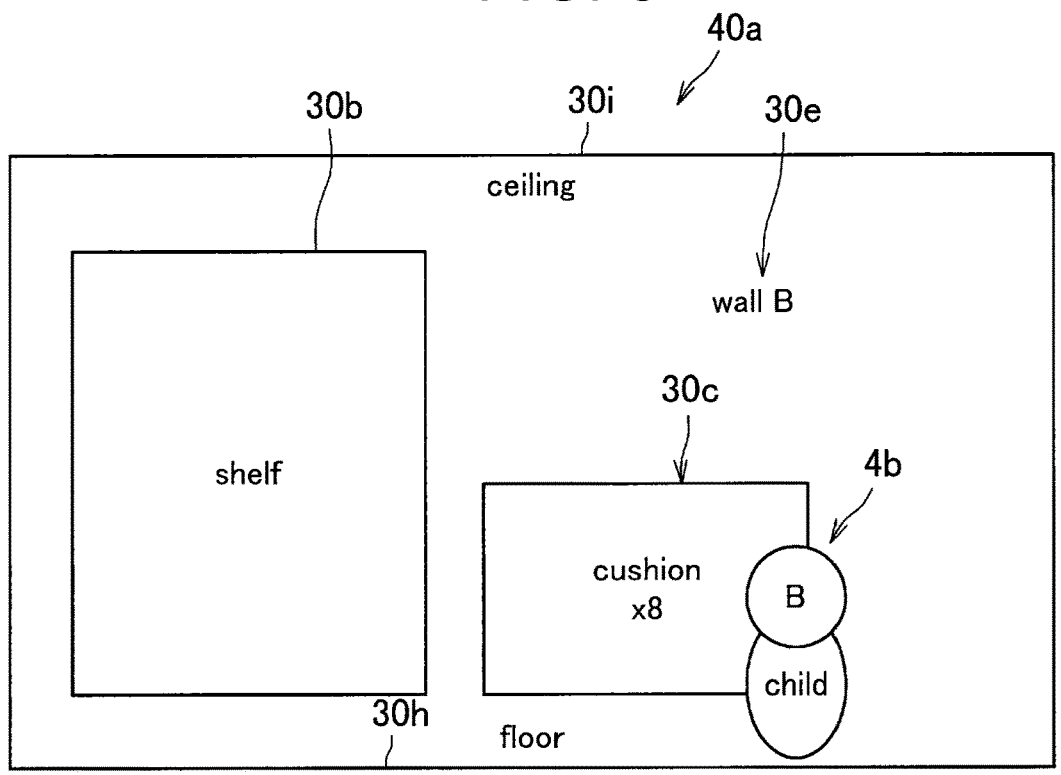
FIG. 3 is a drawing illustrating an example of a distance image in which a forward distance of a user 4a has been measured.
Figure 4:
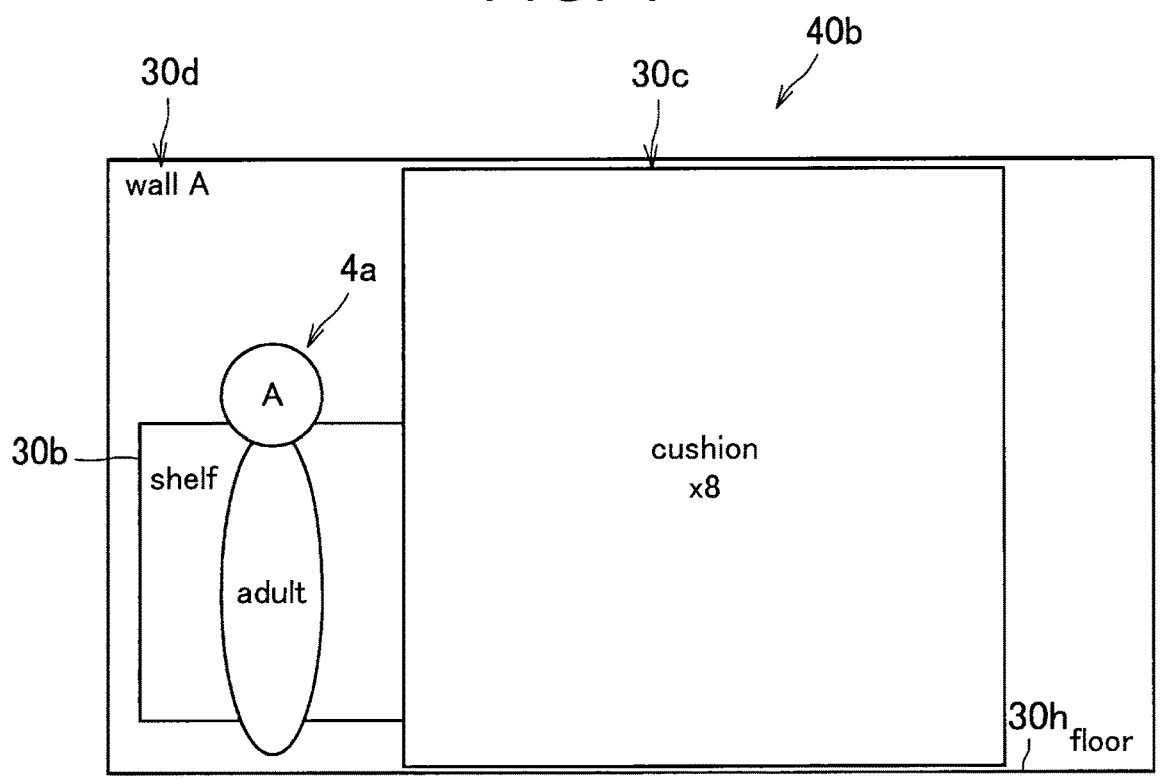
FIG. 4 is a drawing illustrating an example of a distance image in which a forward distance of a user 4b has been measured.

FIG. 3 is a drawing illustrating an example of a distance image (distance image 40a), in which the forward distance of the user 4a has been measured in the room 2 shown in FIG. 1 by, for example, a distance sensor mounted by the user 4a. In addition, FIG. 4 is a drawing illustrating an example of a distance image (distance image 40b), in which the forward distance of the user 4b has been measured in the room 2 by, for example, a distance sensor mounted by the user 4b. Moreover, FIG. 5 is a drawing illustrating an example of a distance image (distance image 40c) measured by, for example, a distance sensor installed on a ceiling of the room 2.

(1-1-1-2 Control Unit 200)

The control unit 200 comprehensively controls operation of the client terminal 20 by using, for example, a Central Processing Unit (CPU), a Random Access Memory (RM) and the like that are built into the client terminal 20. In addition, as shown in FIG. 2, the control unit 200 includes a sensing-result obtaining unit 202, a content information obtaining unit 204, a context information obtaining unit 206, a terminal information obtaining unit. 208, and a user information obtaining unit 210.

(1-1-1-3. Sensing-Result Obtaining Unit 202)

The sensing-result obtaining unit 202 obtains a result of sensing by the sensor unit 228. For example, the sensing-result obtaining unit 202 obtains an image obtained by image-capturing a user's body by a camera (of the sensor unit 228), and a distance image obtained by measuring by a distance sensor (of the sensor unit 228). In addition, the sensing-result obtaining unit 202 obtains user's body state information (for example, a pulsation speed, pupillary opening conditions, a body temperature, a degree of sweating, a degree of tension, etc.) sensed by the sensor unit 226 (such as a thermal sensing sensor, a perspiration sensor, a living-body sensor, a microphone, or a camera).

(1-1-1-4. Content Information Obtaining Unit 204)

The content information obtaining unit 204 obtains information related to VR content that is being used by a user (hereinafter referred to as "content information"). FIG. 6 is an explanatory drawing illustrating an example of content information (content information 42). As shown FIG. 6, the content information 42 includes the fields of: kind of content 420; degree of danger at the time of coming in contact with another user 422; user's movement assumed information. 424; and the number of users who are concurrently using content 426. Here, for example, user's movement assumed information (for example, an assumed range of user's movement, an assumed speed of user's movement, an assumed frequency of user's movement, a body part that may move, or the like) set by a content producer is stored in the field of the user's movement assumed information 424.

The example shown in FIG. 6 indicates that the kind of the corresponding VR content is "detective problem-solving game". In addition, the example indicates that when a user comes in contact with another user while using the corresponding content, "it is safe if the movement is slow". Further, the example indicates that while the corresponding content is used, it, is assumed that: "user's arms and head move; one or more movements may occur every about ten minutes; hands may move slowly; and a user can move back and forth and around within a 50-cm radius of the user". Moreover, the example indicates that the number of users who are concurrently using the corresponding content is "two persons".

(1-1-1-5. Context Information Obtaining Unit 206)

The context information obtaining unit 206 obtains current context information. Here, the context information can include, for example, information related to a scene that is being reproduced in the VR content, and the like.

(1-1-1-6. Terminal Information Obtaining Unit 208)

The terminal information obtaining unit 208 obtains information related to the client terminal 20 (hereinafter referred to as "terminal information"). Here, the terminal information can include, for example, a kind of the client terminal 20, information indicating an installation position of the client terminal 20, configuration information (for example, presence/absence of a sensing device (for example, a camera, a microphone, an infrared sensor, etc.) in the outer world, a kind of the included sensing device, and the like) of the client terminal 20, and/or the like.

(1-1-1-7. User Information Obtaining Unit 210)

The user information obtaining unit 210 obtains information related to a user who is using the VR content (hereinafter referred to as "user information"). Here, the user information can include a user's ID, a user's name, a user's age, user's body information, and user's external appearance information (for example, whether or not to mount a special device (a protector, etc.), or the like). For example, the user's ID, the user's name, the user's age and the like may be registered in the storage unit 230, or may be registered in the server 10. In addition, the user's body information includes, for example, user's height, arm's length, information related to muscular strength, and/or the like. It should be noted that the user's height and the arm's length can be identified on the basis of, for example, results of sensing by the camera (the sensor unit 228).

(1-1-1-8. Communication Unit 220)

The communication unit 220 transmits/receives information to/from other devices. For example, the communication unit 220 transmits various sensing results obtained by the sensing-result obtaining unit 202, content information obtained by the content information obtaining unit 204, context information obtained by the context information obtaining unit 206, terminal information obtained by the terminal information obtaining unit 208, and user information obtained by the user information obtaining unit. 210 to the server 10 according to the control of the control unit 200. In addition, as described later in detail, the communication unit 220 receives, from the server 10, control information for displaying on the display unit 224, and control information for outputting a sound to the audio output unit 226.

(1-1-1-9. Input Unit 222)

The input unit 222 can include a touch panel, a button, a lever, a switch, and the like. For example, the input unit. 222 may be a controller that is capable of wiredly or wirelessly communicating with the client terminal 20.

The input unit 222 accepts various kinds of inputs by a user. For example, the input unit. 222 accepts input of user's operation information corresponding to the VR content that is being displayed on the display unit 224.

(1-1-1-10. Display Unit 224)

The display unit 224 displays a video image according to the control of the control unit 200. The display unit 224 can be configured as a non-transmission type display device. For example, the display unit 224 can include a Liquid Crystal Display (LCD), an Organic Light Emitting Diode (OLED), or the like. Incidentally, in this case, a video image ahead of a user, which is taken by the sensor unit 228 (camera), may be displayed on the display unit 224.

(1-1-1-11. Audio Output Unit 226)

The audio output unit 226 outputs a sound according to the control of the control unit 200. The audio output unit 226 can be configured as, for example, a speaker, an earphone, a headphone, or the like. It should be noted that the audio output unit 226 and the display unit 224 may be configured as an integrated device.

(1-1-1-12. Storage Unit 230)

The storage unit 230 stores various kinds of data and various kinds of software.

<1-2. Server 10>

The server 10 is an example of an information processing device in the present disclosure. On the basis of information received from the client terminal 20, the server 10 is capable of determining a range of a movable space in the real space (the room. 2, etc.) in which the user 4 is located.

In addition, the server 10 is capable of performing various control (for example, the control of displaying, the control of outputting a sound, etc.) of the client terminal 20 through the communication network 22.

It should be noted that although FIG. 1 illustrates only one server 10, the present disclosure is not limited to such an example. The functions of the server 10 according to the present embodiment may be realized by causing a plurality of computers to operate in cooperation.

<1-3. Communication Network 22>

The communication network 22 is a wired or wireless transmission path of information transmitted from a device connected to the communication network 22. For example, the communication network 22 may include: a public network such as a telephone network, the Internet, and a satellite communication network; various kinds of Local Area Network (LAN) and Wide Area Network (WAN) including Ethernet (registered trademark); and the like. In addition, the communication network 22 may include a leased line network such as Internet Protocol-Virtual Private Network (IP-VPN).

<1-4. Organization of Problems>

The configuration of the information processing system according to the present embodiment has been explained above. Incidentally, usually, the flexibility of movement of a user who is using the VR content becomes higher with the expansion of the range of the movable space. Accordingly, it is preferable to set the range of the movable space as wide as possible within a range within which the user can move securely.

Figure 7:
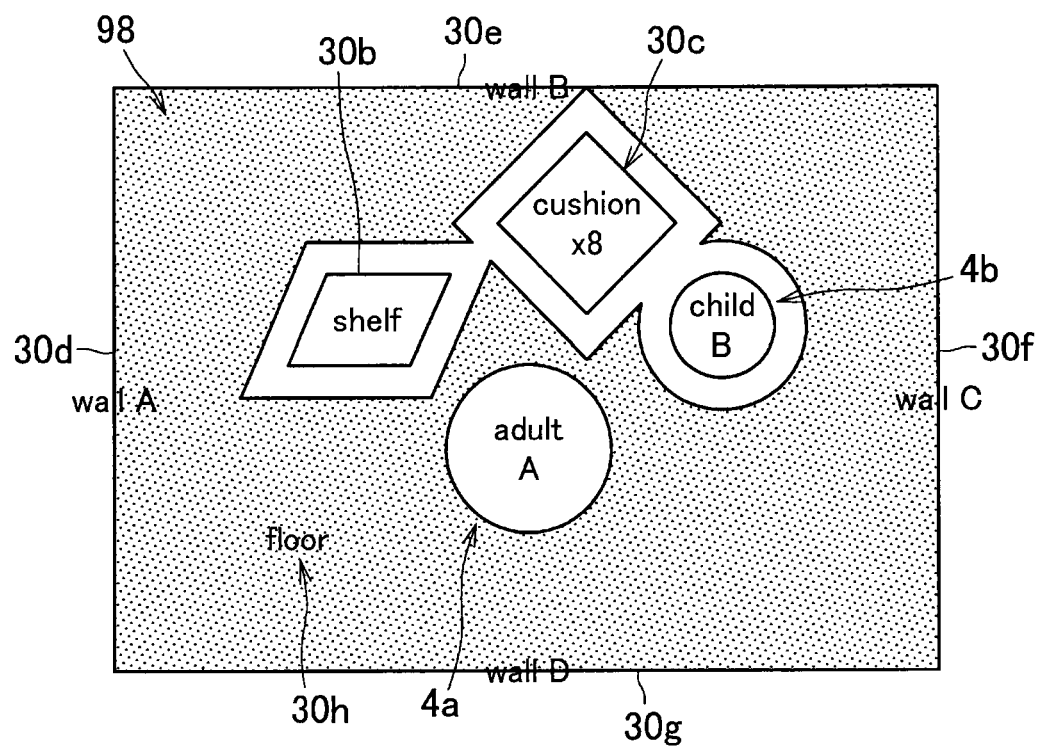
FIG. 7 is a drawing illustrating an example of a movable space 98 determined by a comparative example of the present disclosure.

As a comparative example of the present disclosure, there can be considered a method in which the range of the movable space is determined on the basis of only the positional relationship between an individual object and a user in the real space. FIG. 7 is a drawing illustrating an example of a movable space (movable space 98) corresponding to the user 4a, determined by the present comparative example, in the room. 2 shown in FIG. 1. It should be noted that the movable space 98 corresponds to a region illustrated with half-tone dot meshing in FIG. 7. In other words, the movable space 98 excludes all of a space covering a shelf 30b, a space covering a child 4b, and a space covering eight cushions 30c.

However, in the present comparative example, for example, a movable space is set without considering all of user's body information, the kind of VR content, and attribute information of each object. Therefore, a range of the movable space may be narrowly set.

For example, a position of an object, that can be touched by the user at a point at which the user is located can become farther with the decrease in user's height. Therefore, the range within which the user can move securely can also become wider. In addition, in a case where the user slowly moves at the time of using the VR content, no problem occurs (safe) in many cases even if the user comes in contact with surrounding other objects (a desk, etc.). Moreover, in a case where a material of an object is soft (for example, a cushion, etc.), no problem occurs in many cases even if the user comes in contact with the object.

Accordingly, considering the above-described circumstance as one viewpoint, the server 10 according to the present embodiment has been devised. The server 10 according to the present embodiment is capable of obtaining body information of a user, and is capable of determining a movable space in the real space in which the user is located on the basis of the body information of the user. In addition, while the VR content is displayed by the display unit 224, the server 10 is capable of causing a sign indicating positional relationship between a boundary region of the determined movable space and the user to be displayed with the sign superimposed on the VR content. Therefore, the movable space can be more widely determined in a scene in which the user uses the VR content, and the user can be informed of the positional relationship between the boundary region of the movable space and the user.

It should be noted that in the present, description, hereinafter, there is a case where a space outside the movable space is referred to as "danger space". In addition, the boundary region of the movable space can be a region that includes a surface of a boundary between the movable space and the danger space. For example, the boundary region of the movable space may be the same as the surface of the boundary. Alternatively, the boundary region of the movable space may be a predetermined space in the movable space, in which the surface of the boundary is one end surface, or may be a predetermined space in a danger space in which the surface of the boundary is one end surface.

2. DETAILED EXPLANATION OF EMBODIMENTS

<2-1. Configuration>

Figure 8:
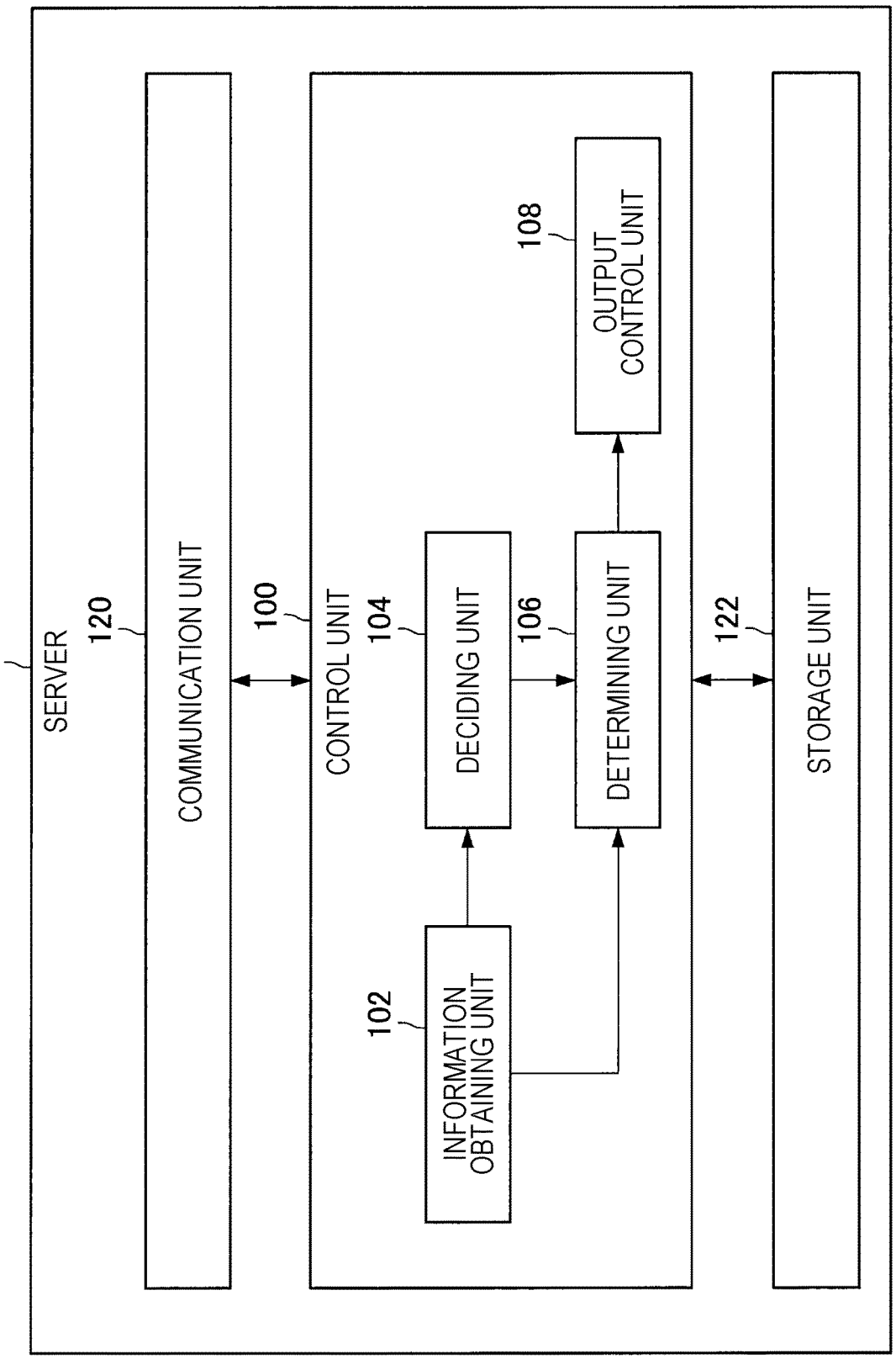
FIG. 8 is a functional block diagram illustrating a functional configuration example of a server 10 according to the embodiment.

Next, a configuration according to the present embodiment will be described in detail. FIG. 8 is a functional block diagram illustrating a configuration example of the server 10 according to the present embodiment. As shown in FIG. 8, the server 10 includes a control unit 100, a communication unit 120, and a storage unit 122.

{2-1-1. Control Unit 100}

The control unit 100 can include, for example, a processing circuit such as the undermentioned. CPU 150. The control unit 100 comprehensively controls operation of the server 10. In addition, as shown in FIG. 8, the control unit 100 includes an information obtaining unit 102, a deciding unit 104, a determining unit 106, and an output control unit 108.

{2-1-2. Information Obtaining Unit 102}

(2-1-2-1. Obtaining of Information)

The information obtaining unit 102 is an example of an obtaining unit in the present disclosure. The information obtaining unit 102 obtains various sensing results, content information, context information, terminal information, and/or user information, which have been received from the client terminal 20.

In addition, the information obtaining unit 102 identifies distance information, and direction information, related to each individual object in the room 2 on the basis of a captured image and a distance image received from the client terminal 20, the distance information and the direction information corresponding to a current position of a user.

(2-1-2-2. Obtaining of Attribute Information of Object)

Moreover, the information obtaining unit 102 subjects the captured image and the distance image received from the client terminal 20 to image recognition and general object recognition, and then obtains attribute information of each individual object in the room 2 on the basis of a result of the recognition. Here, the attribute information of the objects includes, for example, the kind, material, hardness and the like of each object.

It should be noted that further, as shown in, for example, FIGS. 3 to 5, the information obtaining unit 102 may associate an image region of each individual object in the obtained distance image (and the obtained captured image) with attribute information of the each individual object (for example, the kind and the like of each object).

FIG. 9 is a drawing illustrating an example of information related to each individual object in the room 2 (information 44 related to surrounding objects), the information having been obtained by the information obtaining unit 102. It should be noted that FIG. 9 illustrates an example of the information 44 related to surrounding objects with reference to the user 4a shown in FIG. 1. In the example shown in FIG. 9, the information 44 related to surrounding objects includes the fields of kind of object 440, direction 442, distance 444, material 446, and hardness 448. Here, a relative direction of a corresponding object relative to the user 4a is recorded in the direction 442. In addition, a distance of the corresponding object from the user 4a is recorded in the distance 444. Moreover, the kind of object 440, the material 446 and the hardness 448 are shown as an example of the attribute information of objects. A kind of object, a material and hardness that have been recognized related to the corresponding object are recorded in the kind of object 440, the material 446 and the hardness 448 respectively.

(2-1-2-3. Obtaining of User Information)

In addition, by performing user's action recognition on the basis of various sensing results (captured image, distance image, a result of measuring acceleration, etc.) received from the client terminal 20, the information obtaining unit 102 is also capable of obtaining a result of the action recognition. For example, the information obtaining unit 102 is capable of recognizing user's action in real time on the basis of, for example, various sensing results obtained in real time. Moreover, the information obtaining unit 102 is also capable of further estimating a user's posture on the basis of the captured image or the like received from the client terminal 20.

Further, the information obtaining unit 102 is capable of identifying an excitement degree of a user on the basis of various sensing results received from the client terminal 20 (for example, a result of sensing by a living-body sensor, etc.). For example, with the increase in measured value of pulsation of a user, the information obtaining unit 102 calculates an excitement degree of the user to be a higher value. Furthermore, in a case where it is identified that pupils of a user are more widely open, the information obtaining unit 102 calculates an excitement degree of the user to be a higher value.

Figure 10:
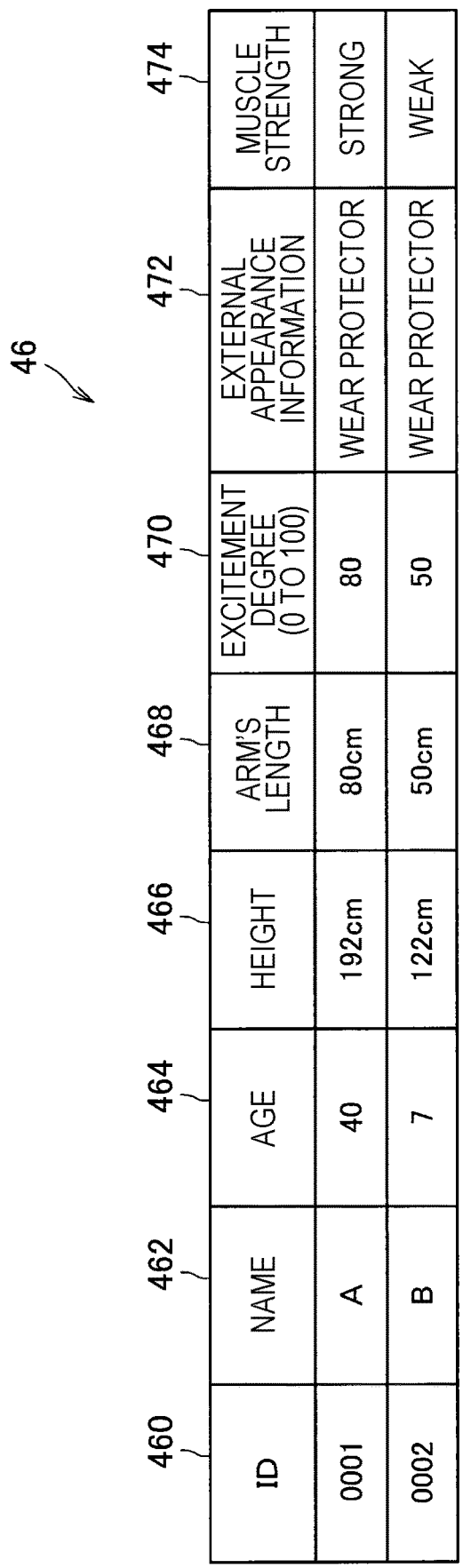
FIG. 10 is a drawing illustrating an example of user information.

FIG. 10 is a drawing illustrating an example of user information (user information 46) that has been (finally) obtained by the information obtaining unit 102. As shown in FIG. 10, the user information 46 includes the fields of user ID 460, name 462, age 464, height 466, arm's length 468, excitement degree 470, external appearance information 472, and muscle strength 474. Here, corresponding values stored in the user information received from the client terminal 20 can be recorded in the user ID 460, the name 462, the age 464, the height 466, the arm's length 468, the external appearance information 472, and the muscle strength. 474 respectively. In addition, the excitement degree calculated by the information obtaining unit 102 is recorded in the excitement degree 470 as described above.

{2-1-3. Deciding Unit 104}

The deciding unit 104 decides a degree of danger of each individual object in the room 2 (at a high level) on the basis of user's body information obtained by the information obtaining unit 102. For example, the deciding unit 104 decides a degree of danger of each individual object in the room 2 (at a high level) on the basis of user's body information, and on the basis of at least one of: attribute information of each individual object in the room 2; a kind of VR content that is being used by the user; information related to a scene that is being reproduced in the VR content; a result of recognizing action of the user; and a result of detecting an excitement degree of the user. Here, the high-level decision can mean an advanced decision that requires, for example, understanding of contents, and understanding of meaning. It should be noted that as a modified example, the deciding unit 104 may decide a degree of danger of each individual object by further using a knowledge database. Alternatively, the deciding unit 104 may decide a degree of danger of each individual object by further sending an inquiry to an agent system.

(2-1-3-1. Decision Example 1)

For example, first of all, the deciding unit 104 identifies a range within which a user's body (for example, a hand, etc.) can reach at a current user position. In addition, with respect to each individual object located within the identified range, the deciding unit 104 decides a degree of danger of the object on the basis of attribute information of the object. In addition, the deciding unit 104 decides that all objects located outside the identified range are not danger (for example, "safest").

Figure 11:
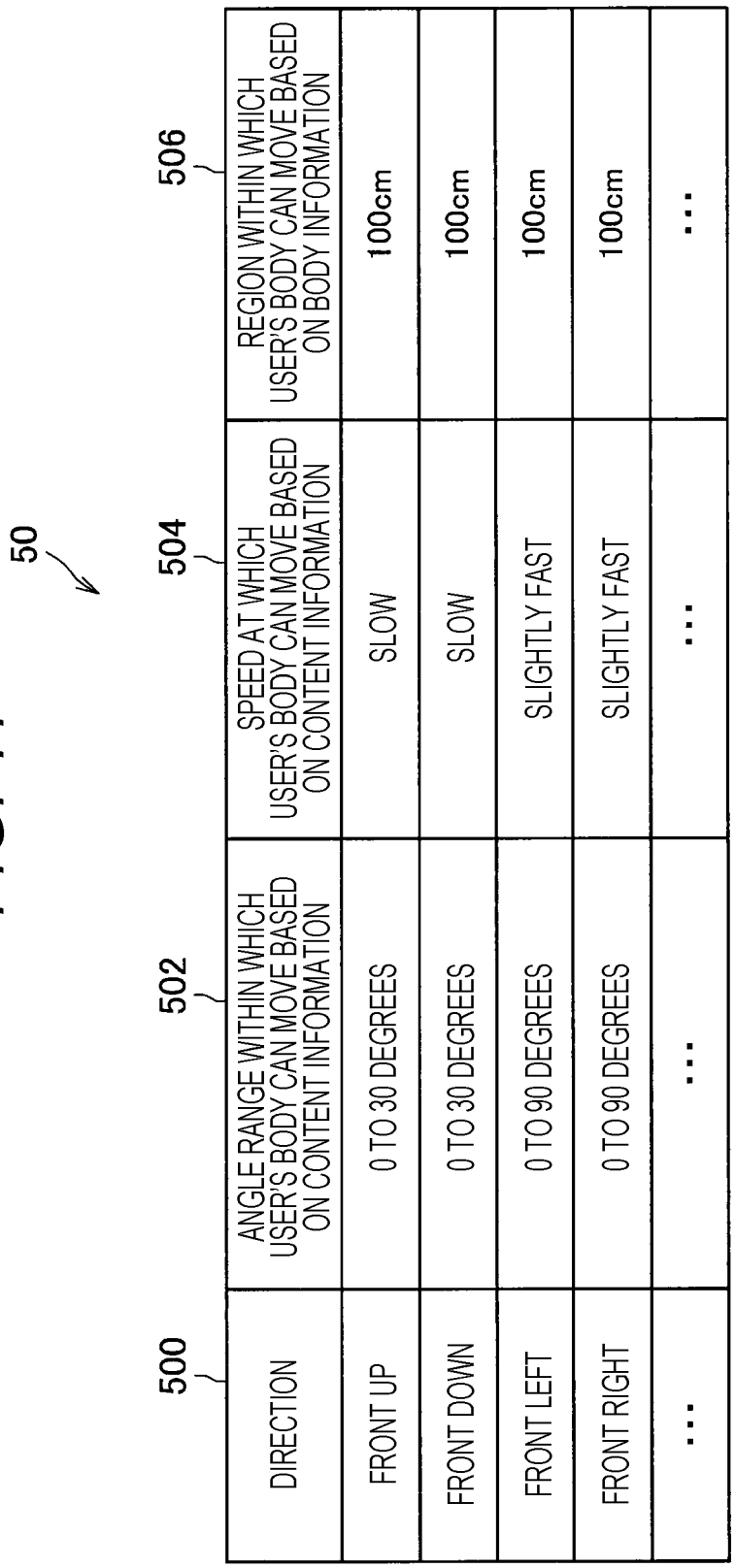
FIG. 11 is a drawing illustrating an example of a result of deciding a range within which a user's body can reach.

Here, the above-described function will be described is more detail with reference to FIGS. 11 and 12. FIG. 11 is a drawing illustrating an example of a result of deciding, by the deciding unit 104, a range within which a user's body can reach. As shown in FIG. 11, for example, for each direction around a user, the deciding unit 104 decides an angle range 502 within which the user's body can move with respect to the direction, a degree of speed 504 at which the user's body can move with respect to the direction, and a size (for example, a distance) 506 of a range within which the user's body can move with respect to the direction, on the basis of the kind of VR content that is being used by the user, and the user's body information.

Figures 12, 13:
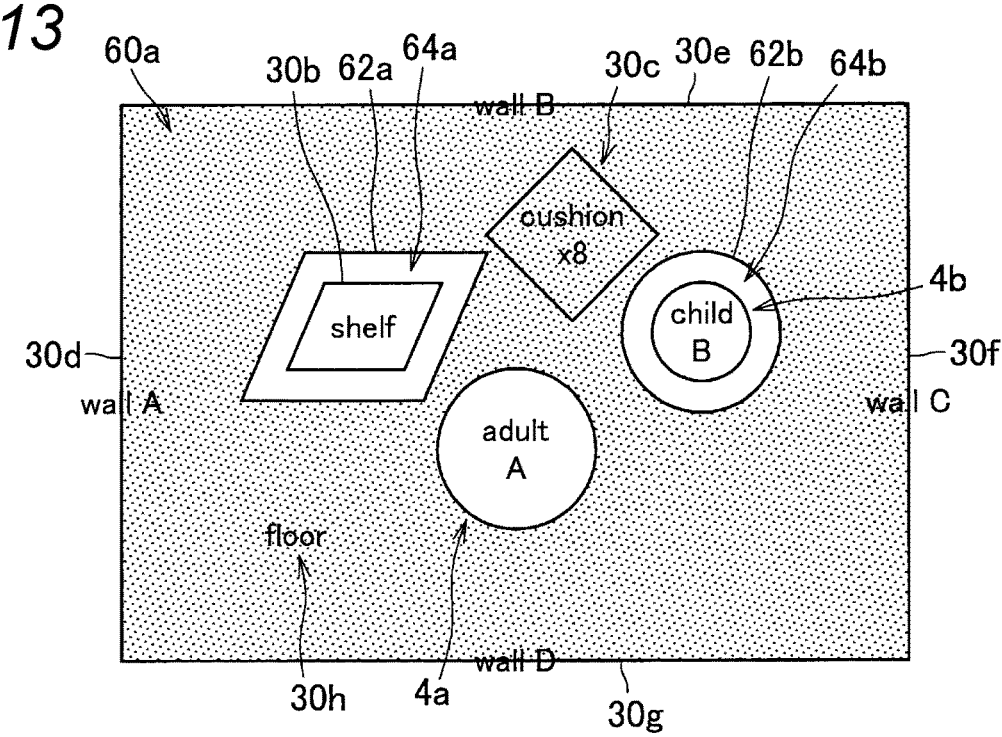

In addition, FIG. 12 is a drawing illustrating an example of a result of deciding a degree of danger of each individual object by the deciding unit 104 based on information related to each individual object shown in FIG. 9, and a result of deciding a range within which the user's body can reach shown in FIG. 11. As shown in FIG. 12, for example, first of all, on the basis of the direction information, and the position information, related to each individual object with respect to the user shown in FIG. 9, and on the basis of a result of deciding a range within which the user's body can reach shown in FIG. 11, the deciding unit 104 decides a possibility 522 that the user will come in contact with (or collide with) the each individual object.

In addition, with respect to an individual object that has been decided to have a possibility of coming in contact with the user, that is to say, "YES", the deciding unit 104 decides a degree of danger of the object on the basis of the attribute information (for example, the material, and the hardness, etc.) of the object shown in FIG. 9, and on the basis of a degree of speed at which a user's body can move with respect to a direction of the object shown in FIG. 11. For example, as shown in FIG. 12, since a material of the shelf 30b is iron (metal), the deciding unit. 104 decides that a degree of danger of the shelf 30b is "dangerous". Moreover, the kind of object of the user 4b is "human", a degree of speed at which the user's body can move with respect to the direction in which the user 4b is located is "slightly fast", and the muscle strength of the user 4a is strong. Therefore, the deciding unit 104 decides that a degree of danger of the user 4b (child) (for the user 4a) is "most dangerous". Further, since the material of the cushion. 30c is cloth, the deciding unit 104 decides that a degree of danger of the cushion 30c is "safe".

Furthermore, in the example shown in FIG. 12, with respect to an individual object that has been decided to have no possibility of coming in contact with the user, that is to say, "No", the deciding unit 104 decides that a degree of danger of the object is, for example, "safest".

According to the above-described decision example, it can be decided that, for example, a soft object (the cushion 30c, etc.) "safe" even there is a possibility of coming in contact with the user 4a. As the result, while the safety is ensured, the movable space can be more widely determined in comparison with the present comparative example by the undermentioned determining unit 106.

In addition, in a case where there is a difference in height between the user 4a and the user 4b, even if the user 4a and the user 4b are located at the same point, the deciding unit 104 is capable of making a decision in such a manner that a degree of danger of each individual object in the room 2 differs for each user 4h. In other words, the deciding unit 104 is capable of properly deciding a degree of danger of each individual object according to a height of each individual user 4.

Incidentally, even if there is a possibility that the user 4b (child) will come in contact with the user 4a (adult), the muscle strength of the user 4b is weak. Therefore, it is considered that the user 4b does not injure the user 4a, or does not cause the user 4a to feel pain. Accordingly, the deciding unit 104 may decide that a degree of danger of the user 4a (for user 4b) is "safe".

(2-1-3-2. Decision Example 2)

In addition, the deciding unit 104 is also capable of deciding a degree of danger of each individual object on the basis of a combination of attribute information of each individual object and user's action recognition. For example, in a case where a user stands near the cushion 30c, the deciding unit 104 decides that the cushion. 30c is "safe". In addition, in a case where the user is going to get on the cushion 30c or has gotten on the cushion 30c, the deciding unit 104 may decide that the cushion 30c is "dangerous" (because the cushion 30c is slippery).

(2-1-3-3. Modified Example 1)

It should be noted that in a case where predetermined conditions are satisfied as a modified example, the deciding unit 104 may decide that a degree of danger of each individual object is relatively low. For example, in a case where a kind of VR content is "fighting game", the deciding unit 104 may decide that a degree of danger of each individual object is relatively low. As the result, a range of a movable space determined by the undermentioned determining unit 106 can be extended to a certain extent even in a place in which the user will come in contact with an object. In this manner, by causing the user to collide with an object on purpose, realistic sensation of the user can be further enhanced.

In addition, usually, in a case where an excitement degree of the user is high, it is considered that tolerance for danger increases. Accordingly, in a case where an excitement degree of the user is high, the deciding unit. 104 may decide that a degree of danger of each individual object is relatively low.

Moreover, in a case where the user wears a protector, the deciding unit 104 may decide that a degree of danger of each individual object is relatively low (in comparison with a case where the user does not wear a protector). For example, in a case where a kind of VR content is "fighting game", an excitement degree of the user is higher than a predetermined threshold value, and the user wears a protector, it may be decided that a degree of danger of at least one object with which the user has a possibility of coming in contact is "safe".

In addition, usually, in a case where the muscle strength of the user is low (for example, in a case where the user is a child, or the like), it is assumed that the user can bring down only a part of objects by hand. Accordingly, in a case where the muscle strength of the user is low, the deciding unit 104 may decide that a degree of danger of each individual object is relatively low.

Further, usually, in a case where a kind of VR content or a scene that is being reproduced is "conversation" or "eating and drinking", it is assumed that user's movement during displaying of the scene becomes slow. Accordingly, in this case, the deciding unit 104 may decide that a degree of danger of each individual object (for the user) is relatively low.

Furthermore, in a case where it is recognized that action of a user who is using VR content has gradually become smooth, the deciding unit 104 may decide that a degree of danger of each individual object (for the user) is lower than before.

(2-1-3-4. Modified Example 2)

In addition, as another modified example, for example, in a case where a kind of VR content is "love game" or the like, it is also assumed that the user wishes to come in contact with a character (virtual object) in the VR content. Accordingly, in this case, the deciding unit 104 may decide that a degree of danger of each individual object is relatively low.

For example, in a case where a kind of VP content is "love game", and a character has the opposite sex, the deciding unit 104 may decide that a degree of danger of an object located in the real space in which the user is located is "safe", the object corresponding to a display position of the character. This enables the determining unit 106 to determine that the movable space of the user is wider.

(2-1-3-5. Modified Example 3)

In addition, as another modified example, in a case where a captured image (through image) of the real space in which the user is located is displayed in the display unit 224, it is assumed that even if a user's visual field is covered, it becomes possible to avoid coming in contact with each individual object in the real space to some extent. Accordingly, the deciding unit 104 may decides a degree of danger of each individual object on the basis of whether or not a captured image (through image) of the real space in which the user is located is displayed in the display unit 224. For example, in a case where a captured image (through image) of the real space is displayed in the display unit 224, the deciding unit 104 decides that a degree of danger of each individual object is relatively low. This enables the determining unit 106 to determine that the movable space of the user is wider.

{2-1-4. Determining Unit 106}

The determining unit 106 determines, on a user basis, a range of a movable space corresponding to the user on the basis of various information obtained by the information obtaining unit 102, and a result of deciding by the deciding unit 104. For example, the determining unit 106 determines, on a user basis, a range of a movable space corresponding to the user in such a manner that the movable space corresponding to the user excludes all objects, for which it has been decided that degrees of danger are higher than or equal to a predetermined threshold value, from among all objects located in the room 2. In addition, the determining unit 106 may determine, on a user basis, a movable space corresponding to the user in such a manner that the movable space corresponding to the user includes at least one object, for which it has been decided that a degree of danger is lower than the predetermined threshold value, from among all objects located in the room 2. Here, the predetermined threshold value may be "dangerous" in the example shown in FIG. 12. In this case, the degrees of danger higher than or equal to the predetermined threshold value are "dangerous" and "most dangerous".

Moreover, the determining unit 106 determines, on a user basis, a boundary region of the movable space corresponding to the user with reference to a position of each individual object, for which it has been decided that a degree of danger) is higher than or equal to the predetermined threshold value, from among all objects located in the room 2. For example, with respect to each individual object, for which it has been decided that a degree of danger is higher than or equal to the predetermined threshold value, from among all objects located in the room 2, the determining unit 106 may determine, on a user basis, a boundary region of the movable space in such a manner that the boundary region corresponding to the object is provided at a position that becomes nearer from the user with the increase in degree of danger of the object.

(2-1-4-1. Specific Example)

Here, the above-described function will be described in more detail with reference to FIGS. 13 and 14. FIG. 13 is an explanatory drawing illustrating a determination example in which a range of a movable space (movable space 60a) corresponding to the user 4a in the room 2 shown in FIG. 1 is determined. It should be noted that FIG. 13 illustrates a top view of the room 2, and an area illustrated with half-tone dot meshing in Fi corresponds to the movable space 60a.

As shown in FIG. 13, the determining unit 106 determines a range of the movable space 60a on the basis of a decision result 524 of deciding a degree of danger of each individual object shown in FIG. 12, and the size 506 of the range within which the user's body shown in FIG. 11 can move (identified by the user's body information). More specifically, the determining unit 106 determines a range of the movable space 60a so as to exclude all of a space covering the shelf 30b, and a space covering the user 4b (child). For example, the determining unit 106 determines a boundary region 62a for the shelf 30b, the degree of danger (for the user 4a) of which is "dangerous", and determines a boundary region 62b for the user 4b, the degree of danger of which is "most dangerous". It should be noted that as shown in. FIG. 13, the determining unit 106 is also capable of further determining a space outside the movable space 60a as a dangerous space 64.

Figure 14:
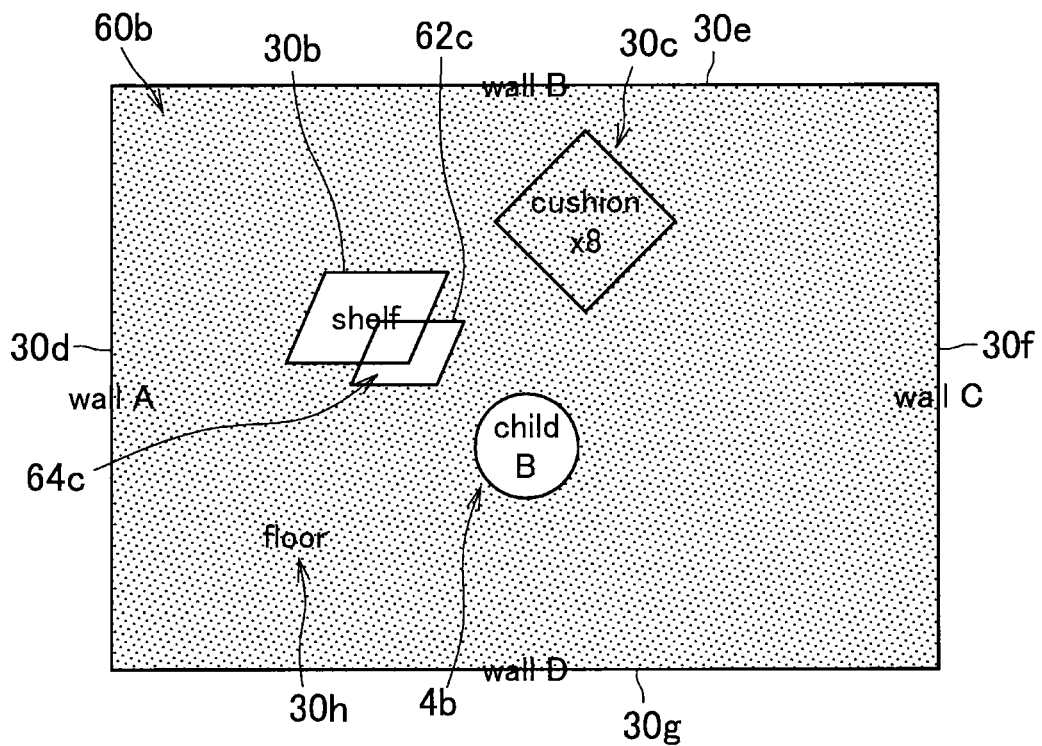
FIG. 14 is an explanatory drawing illustrating an example of determining a range of a movable space 60b corresponding to a user 4b.

In addition, FIG. 14 is an explanatory drawing illustrating a determination example in which in a case where it is assumed that the user 4b is located at a position of the user 4a shown in FIG. 13, a range of a movable space (movable space 60b) corresponding to the user 4b is determined. It should be noted that FIG. 14 illustrates a top view of the room 2, and an area illustrated with half-tone dot meshing in FIG. 14 corresponds to the movable space 60b.

As shown in FIG. 14, the determining unit 106 determines only a space within a range within which the user 4b can reach in the shelf 30b, the degree of danger (for the user 4b) of which is "dangerous", as a dangerous space 64c corresponding to the user 4b, and determines all spaces outside the dangerous space 64c as the movable space 60b. As shown in FIGS. 13 and 14, the movable space 60b corresponding to the user 4b can be determined so as to become larger than the movable space 60a corresponding to the user 4a. In other words, the movable space 60b corresponding to the user 4b can be determined in such a manner that with the decrease in height of a user located at the same point, a range of the movable space corresponding to the user becomes larger.

{2-1-5. Output Control Unit 108}

(2-1-5-1. Display Example 1)

The output control unit 108 controls displaying in the client terminal 20 (the display unit 224). For example, while VR content is displayed in the display unit 224, the output control unit. 108 causes a sign indicating positional relationship between the user and a boundary region of a movable space corresponding to the user, the boundary region having been determined by the determining unit 106, to be displayed with the sign superimposed on the VR content.

As an example, on the basis of a result of making an estimation as to whether or not a body of the user can come in contact with a boundary region of a movable space corresponding to the user at a current position of the user, the output control unit 108 causes a sign indicating positional relationship between the boundary region of the movable space and the user to be displayed with the sign superimposed on the VR content. More specifically, in a case where it is estimated that the user can come in contact with at least a part of the boundary region of the movable space at a current position of the user, the output control unit 108 causes a sign indicating positional relationship between the boundary region of the movable space and the user to be displayed with the sign superimposed on the VR content. In addition, in a case where it is estimated that the user can come in contact with none of the boundary region of the movable space at a current position of the user, the output control unit 108 does not cause a sign indicating relationship between the boundary region of the movable space and the user to be displayed by the display unit 224 worn by the user.

Figure 15:
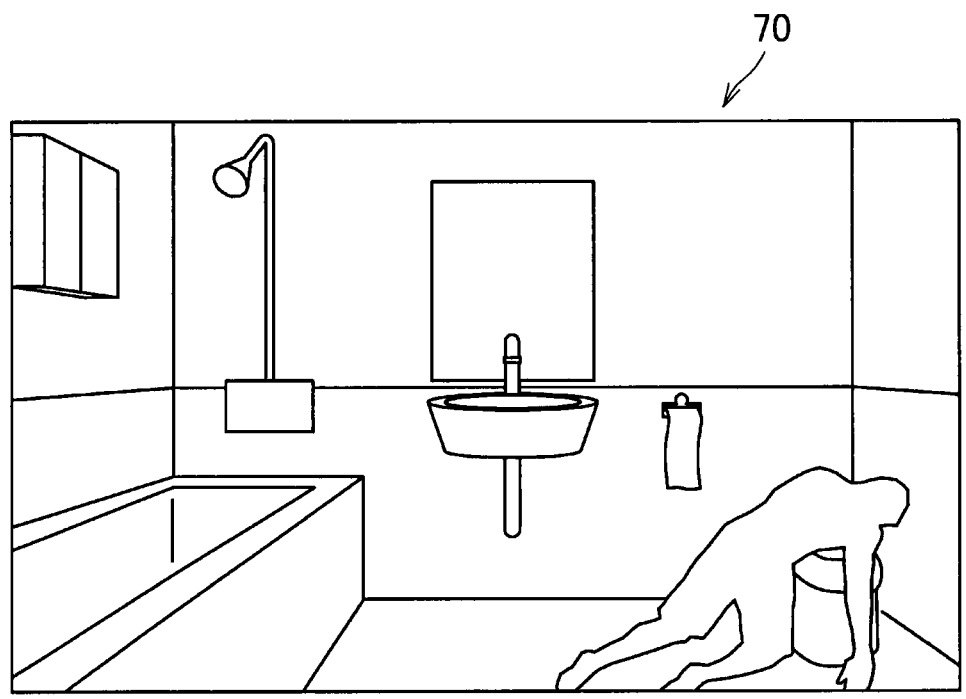
FIG. 15 is a drawing illustrating an example of VR content displayed in a display unit 224.
Figure 16:
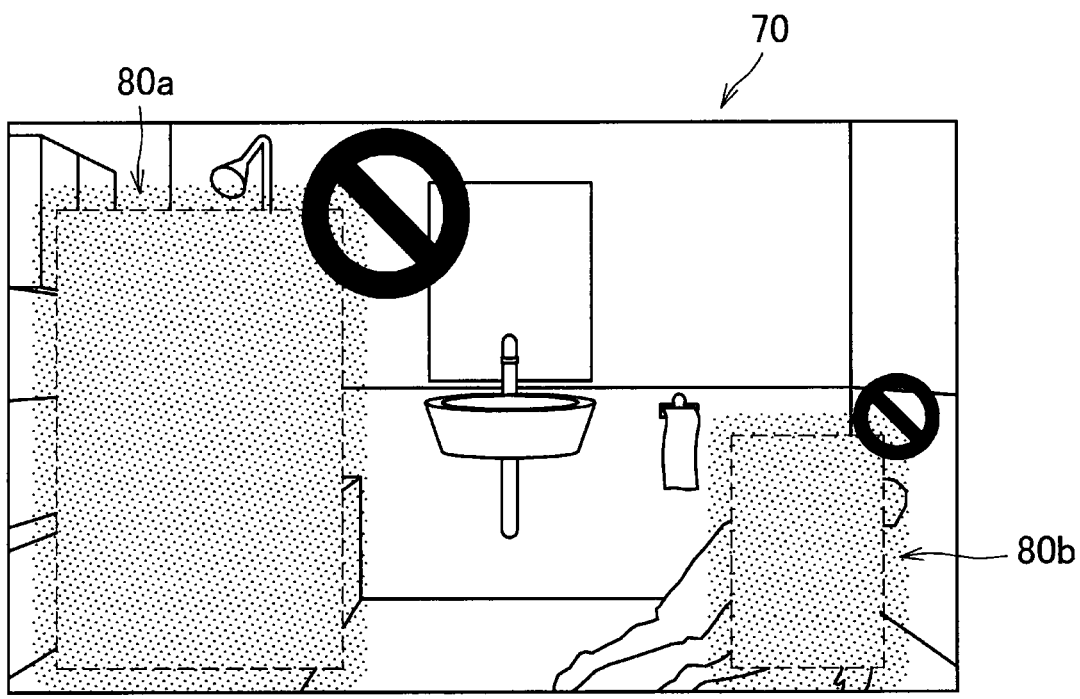
FIG. 16 is a drawing illustrating an example in which an image indicating positional relationship between a boundary region of a movable space corresponding to the user 4a and the user 4a is displayed so as to be superimposed on the VR content.

Here, the above-described function will be described in more detail with reference to FIGS. 15 to 17. FIG. 15 is a drawing illustrating an example of a video image (video image 70) of VR content displayed in the display unit 224. While the video image 70 shown in FIG. 15 is displayed in the display unit 224*a* worn by the user 4*a* (shown in FIG. 1), as shown in FIG. 16, the output control unit 108 causes an image 80 indicating positional relationship between the user 4*a* and the boundary region of the movable space corresponding to the user 4*a*, the boundary region having been determined by the determining unit 106, to be displayed with the image 80 superimposed on the video image 70.

Figure 17:
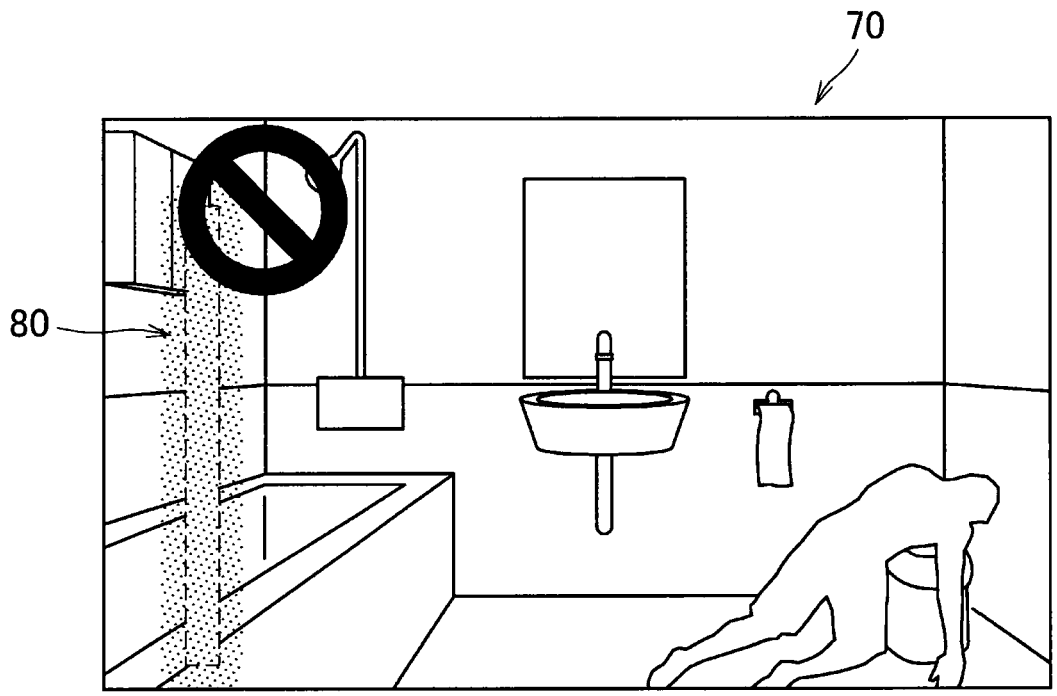
FIG. 17 is a drawing illustrating an example in which an image indicating positional relationship between a boundary region of a movable space corresponding to the user 4b and the user 4b is displayed so as to be superimposed on the VR content.

In addition, while the video image 70 shown in FIG. 15 is displayed in the display unit 224*b* worn by the user 4*b* (shown in FIG. 1), as shown in FIG. 17, the output control unit. 108 causes an image 80 indicating positional relationship between the user 4*b* and the boundary region of the movable space corresponding to the user 4*b*, the boundary region having been determined by the determining unit 106, to be displayed with the image 80 superimposed on the video image 70. According to this display example, when each individual user uses VR content, positional relationship between the user and the boundary region of the movable space determined with respect to the user can be grasped as appropriate. Moreover, each individual user can use the VR content safely.

(2-1-5-2. Display. Example 2)

Figure 18:
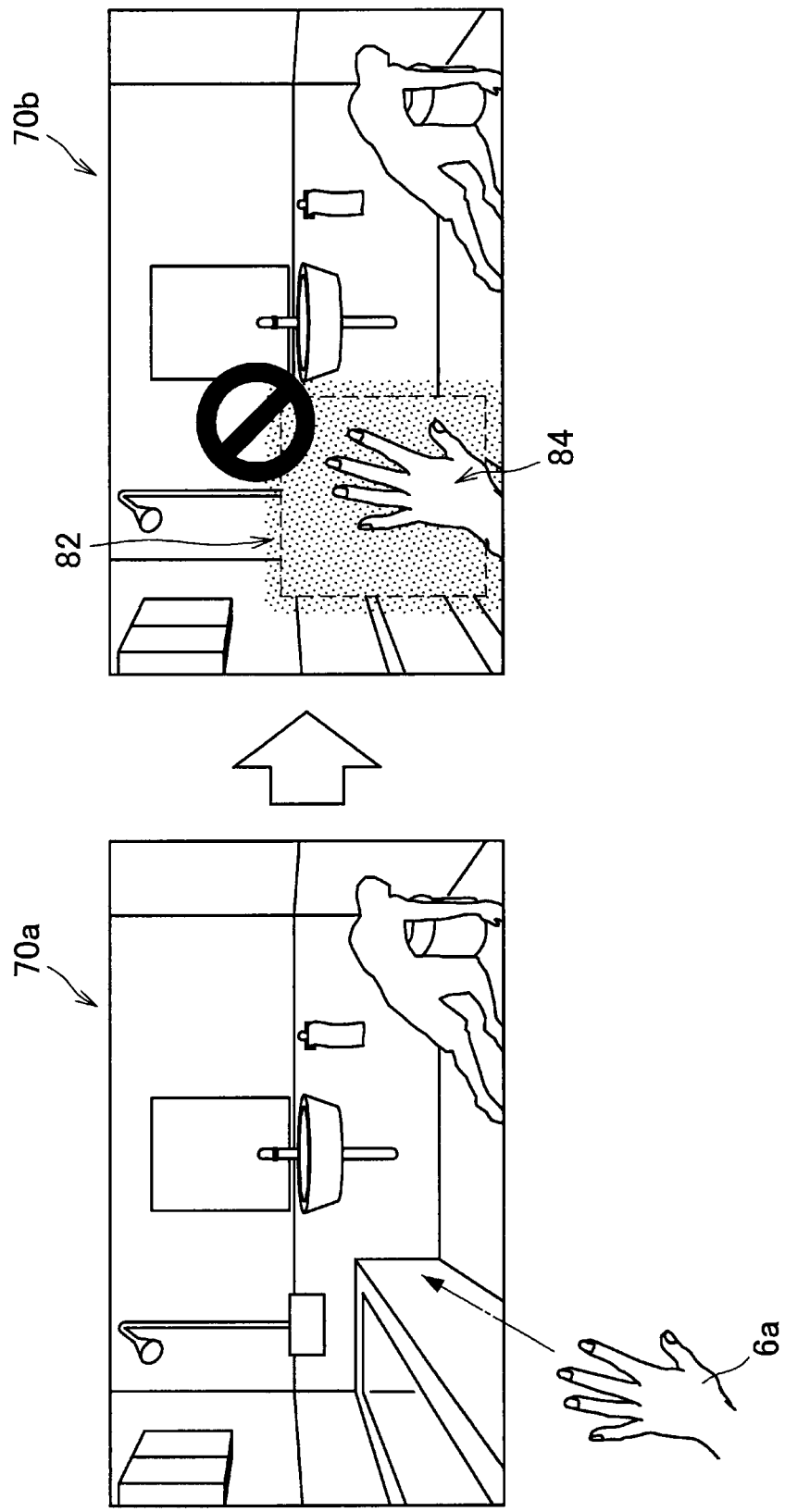
FIG. 18 is a drawing illustrating, as an example, how displaying of the VR content changes when the user 4a pushes his/her hand forward while the VR content is displayed.

In addition, when it has been detected that a part of a user has approached a boundary region of a movable space, the output control unit 108 is also capable of causing a sign indicating the part to be further displayed with the sign superimposed on the VR content. For example, as shown in FIG. 18, while a video image 70*a* of VR content is displayed in the display unit 224, in a case where it has been detected that a hand of the user has approached the boundary region of the movable space, as with the video image 70*b*, the output control unit 108 causes the image 80 indicating a part of the boundary region of the movable space, and the image 84 indicating a hand of the user, to be displayed with the image 80 and the image 84 superimposed on the video image 70 together.

Figure 19:
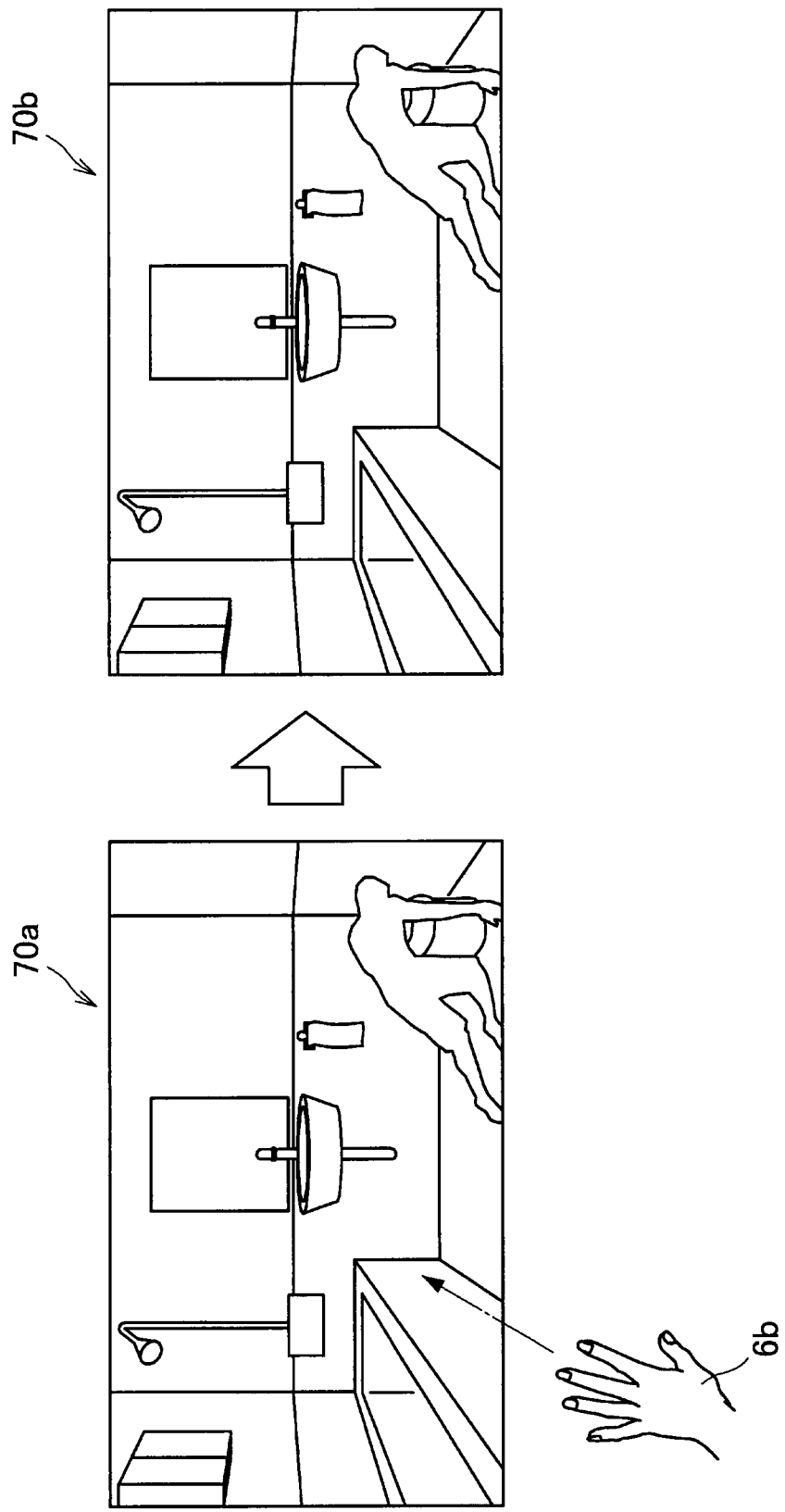
FIG. 19 is a drawing illustrating, as an example, how displaying of the VR content changes when the user 4b pushes his/her hand forward while the VR content is displayed.

FIG. 19 is a drawing illustrating, as an example, how displaying of VR content changes when the user 4*b* (shown in FIG. 1) pushes his/her hand forward while the video image 70*a* of the VR content is displayed. It should be noted that the example shown in FIG. 19 is based on the assumption that the whole range within which the hand of the user 4*b* can move fails within a movable space corresponding to the user 4*b* at a position of the user 4*b* at the time of displaying the video image 70*a*. In this case, as shown in FIG. 19, even if the user 4*b* pushes his/her hand forward, the output control unit 108 does not cause the display unit 224*b* to display an image 80 indicating positional relationship between the boundary region of the movable space and the user 4*b*, and the image 84 indicating the hand of the user.

(2-1-5-3. Modified Example 1)

Figure 20:
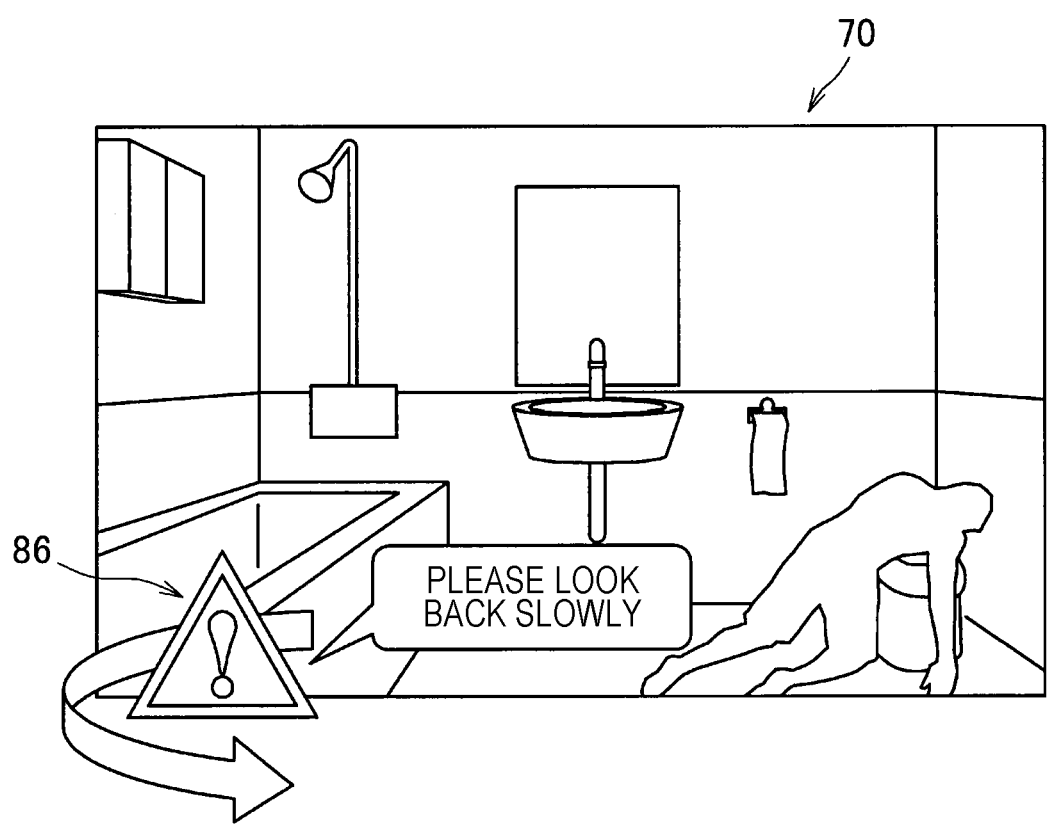
FIG. 20 is a drawing illustrating an example in which a different image indicating positional relationship between the boundary region of the movable space and the user 4 is displayed so as to be superimposed on the VR content.

Incidentally, as a modified example, for example, in a case where it is estimated that a body of a user can come in contact with a boundary region of a movable space corresponding to the user at a current position of the user, as shown in FIG. 20, the output control unit 108 may display a hold image 86 (as an alternative to the image 80) so as to be superimposed on the VR content as a sign indicating positional relationship between the boundary region of the movable space and the user. Here, while the hold image 86 is being displayed, the VR content can be held (fixed). In addition, while the hold image 86 is being displayed, when it is detected that the user has changed a direction to, for example, a direction instructed by the hold image 86 ("the rear of the user" in the example shown in FIG. 20), holding of the VR content can be released. According to this display example, a direction of the user can be changed in such a manner that the user does not come in contact with the boundary region of the movable space. It should be noted that the hold image 86 may be an image that guides not a direction change but a position change.

(2-1-5-4. Modified Example 2)

—Displaying Beforehand

Incidentally, for example, in a case where the degree of danger of each individual object is decided by the modified examples such as those described in "Section 2-1-3-3" to "Section 2-1-3-5", the determining unit 106 is capable of determining a movable space corresponding to the user in such a manner that the user can come in contact with at least one object located in the real space. In this case, the output control unit 108 may partially change a display mode of the VR content before and/or after the user comes in contact with at least one object in the real space.

For example, before the timing in which it is predicted that the user comes in contact with at least one object located in a movable space (that is to say, before the contact), the output control unit 108 may further change a display mode of a predetermined virtual object (a character, etc.) in the VR content.

As an example, before the timing, the output control unit 108 may change a display position of the predetermined virtual object to a position closer to the user in comparison with the actual display position to display the predetermined virtual object.

Figure 21:
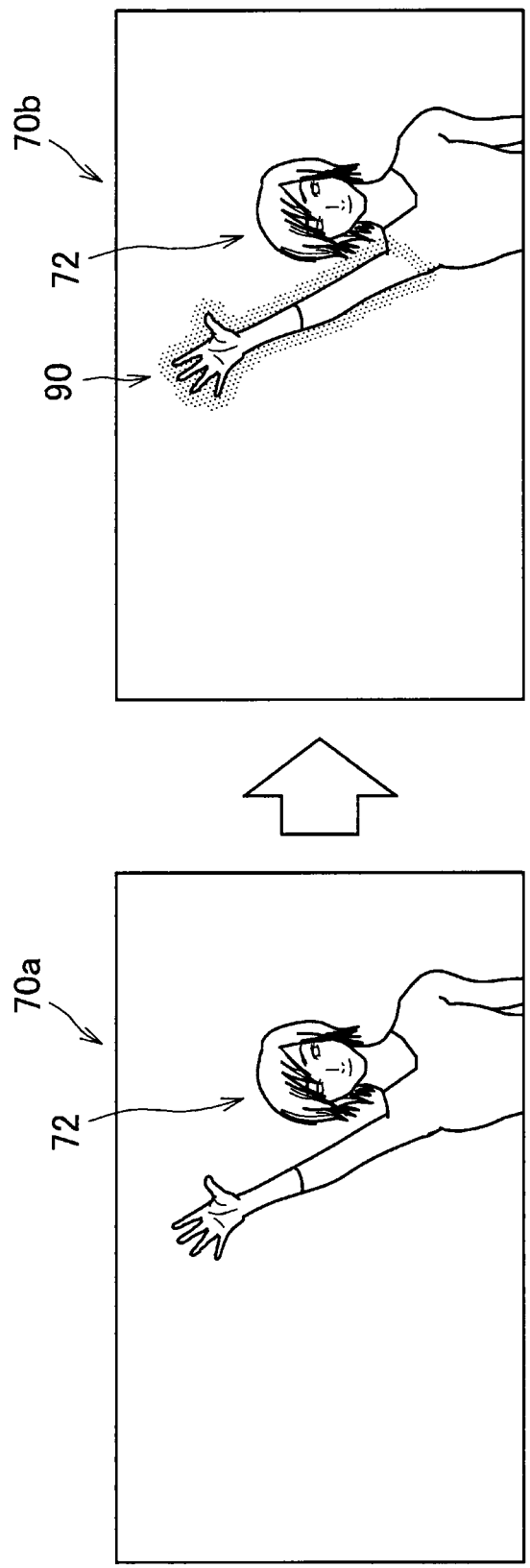
FIG. 21 is a drawing illustrating an example in which a virtual object is displayed while a high-five scene is displayed, and while a user does not come in contact with an object in the real space.

Alternatively, before the timing, the output control unit. 108 may highlight the whole predetermined virtual object, or the outline of a specific part of the predetermined virtual object. For example, the output control unit. 108 may add effects to the outline, or may change a display color of the outline. FIG. 21 is a drawing illustrating an example of the video image 70 of a scene in which a virtual object 72 in VR content does a high five with a user who is viewing the VR content. As shown in FIG. 21, when the video image 70*b* of the high five scene is displayed, the output control unit 108 may add effects 90 to the outline of an arm for giving high five, or may change a display color of the outline, in the virtual object 72.

Alternatively, before the timing, the output control unit 108 may, make three-dimensionality of the predetermined virtual object higher than three-dimensionality of the other virtual objects. This enables the user to visually recognize that the predetermined virtual object is floating. According to these display examples, while the VR content is used, the user can be notified beforehand that there is a risk that the user will come in contact with a real object that has been decided to be "safe".

—Displaying Afterwards

In addition, when it has been detected that the user has come in contact with at least one object located in a movable space, the output control unit 108 may further display a sign indicating the contact at a position that is associated with a predetermined virtual object (a character, etc.) in the VR content (for example, at a position in proximity to the predetermined virtual object, or at a position of the virtual object itself, etc.).

Figure 22:
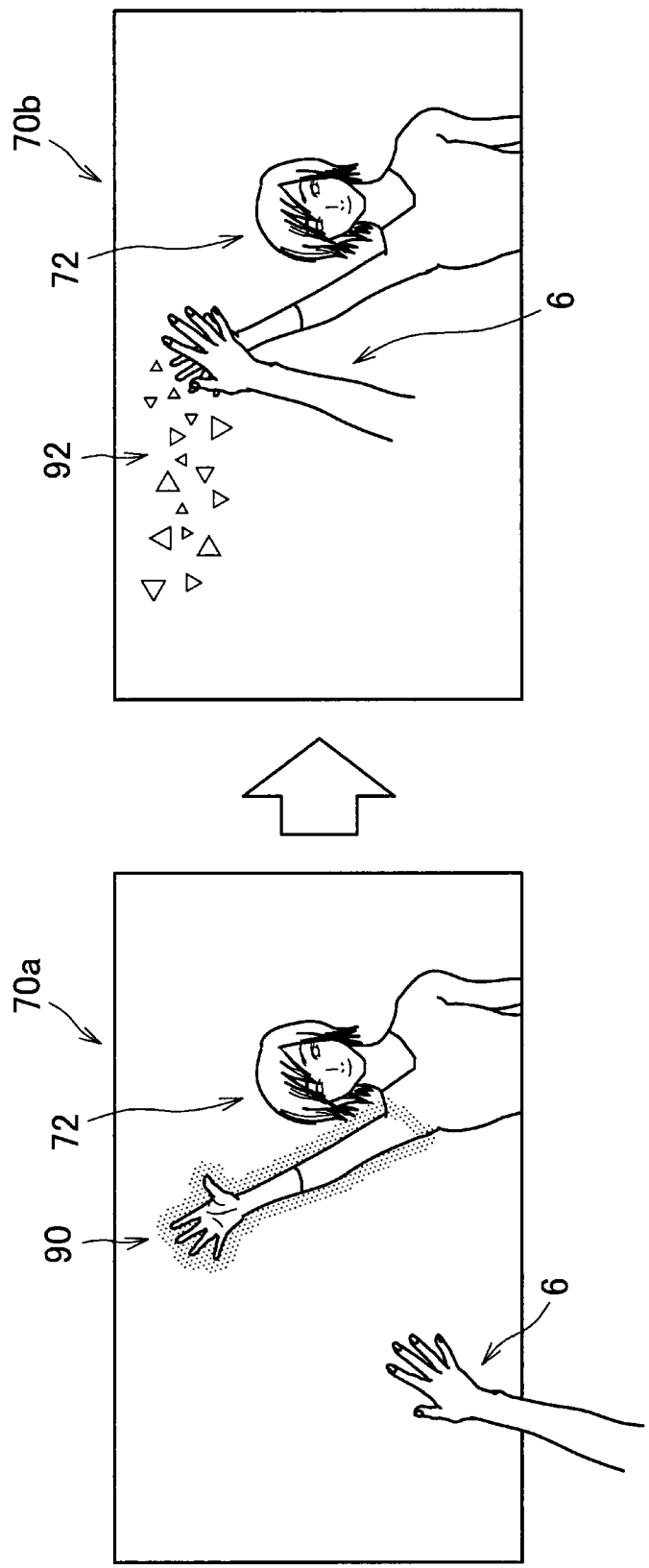
FIG. 22 is a drawing illustrating an example of how displaying of the VR content changes while a high-five scene is displayed, and in a case where the user has come in contact with an object in the real space.

FIG. 22 is a drawing illustrating a display example of the video image 70 displayed in a case where while a scene in which the virtual object 72 in VR content does a high five with a user who is viewing the VR content is displayed, a hand of the user has come in contact with at least one object in the real space. For example, after the display timing of the video image 70a shown in FIG. 22, in a case where it has been detected that a user's body has come in contact with at least one object in the real space, as with the video image 70b, the output control unit 108 may display particles 92 (as a sign indicating the contact) at a position in proximity to the virtual object 72 (for example, at a position in proximity to a hand for giving high five in the virtual object 72) so as to be superimposed on the video image 70. According to this display example, while the VR content is used, the user can be notified afterwards that the user has come in contact with a real object that has been decided to be "safe".

(2-1-5-5. Audio Output Control)

In addition, the output control unit 108 is also capable of controlling the output of sound to the client terminal 20 (the audio output unit 226). For example, in a case where it has been detected that the user is approaching a boundary region of a movable space, the output control unit 108 causes the audio output unit 226 to output a predetermined sound (together with the display control for the display unit 224, or as an alternative to the display control). As an example, this case, the output control unit 108 may control outputting of a sound by the audio output unit 226 in such a manner that the user is notified of a position of the boundary region by using a sound image localization technology. Alternatively, in this case, the output control unit 108 may cause the audio output unit 226 to output a sound, or sound effects, indicating that the user is approaching a dangerous object.

{2-1-6. Communication Unit 120}

The communication unit 120 can include, for example, the undermentioned communication device 162. The communication unit 120 transmits/receives information to/from other devices. For example, the communication unit 120 transmits display control information or sound output control information to the client terminal 20 according to the control of the output control unit 108. In addition, the communication unit 120 receives, from the client terminal 20, various sensing results, content information, context information, terminal information, user information or the like.

{2-1-7. Storage Unit 122}

The storage unit 122 can include, for example, the undermentioned storage device 160. The storage unit 122 stores various kinds of data, and various kinds of software.

<2-2. Process Flow>

The configuration according to the present embodiment has been explained as above. Next, an example of a process flow according to the present embodiment will be described with reference to FIGS. 23 and 24.

{2-2-1. Overall Process Flow}

Figure 23:
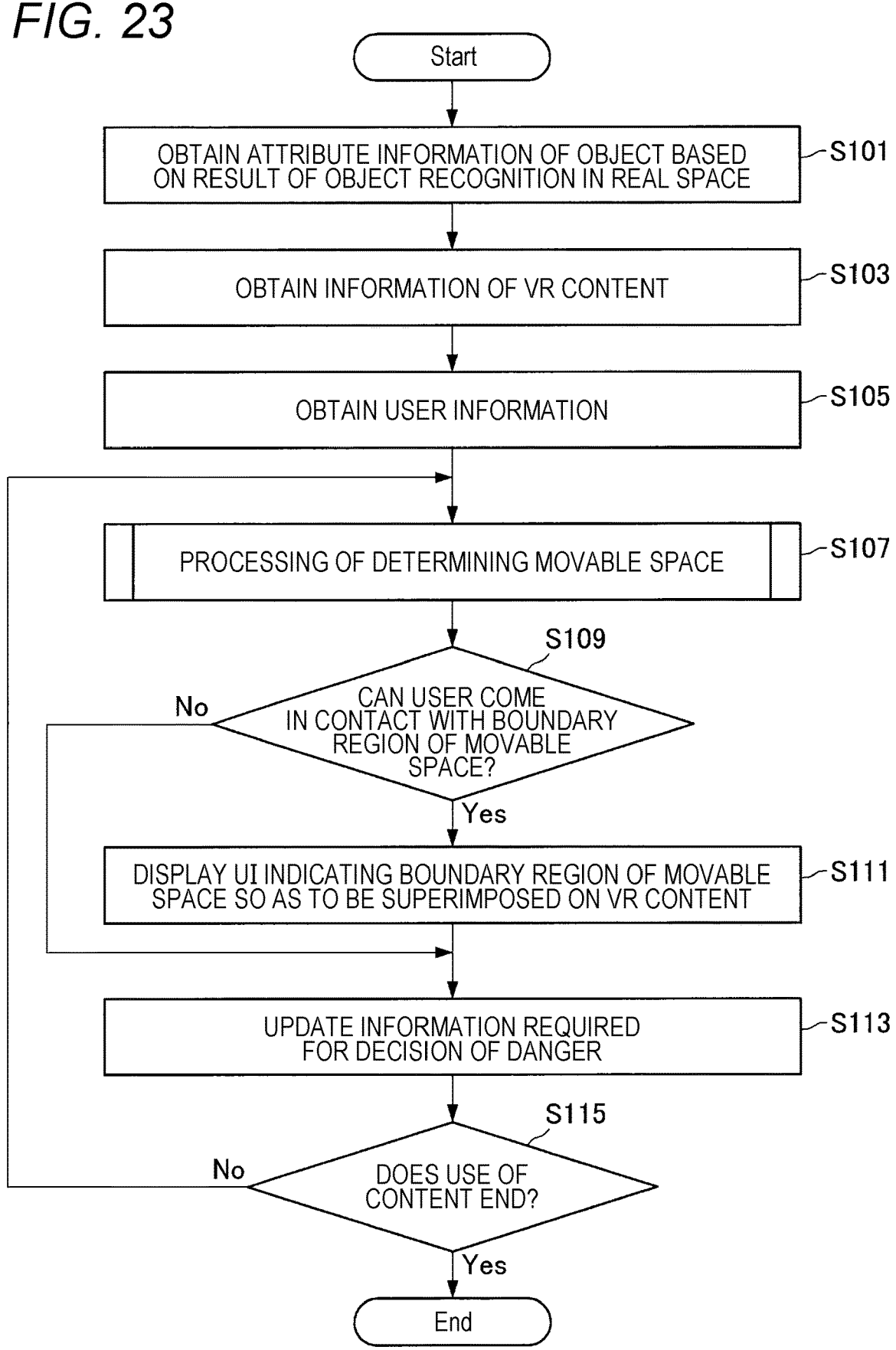
FIG. 23 is a flowchart illustrating an overall flow of processing according to the embodiment.

FIG. 23 is a flowchart illustrating an overall flow of processing according to the embodiment. As shown in FIG. 23, first of all, the client terminal 20 transmits, to the server 10, results of various kinds of sensing by the sensor unit. 228, content information related to VR content that is being displayed in the display unit 224, user information related to a user who is wearing the display unit 224, and the like. In addition, the information obtaining unit 102 of the server 10 obtains the received various kinds of sensing results. Subsequently, the information obtaining unit 102 performs object recognition by using the obtained various kinds of sensing results (captured image, etc.), and on the basis of results of the recognition, the information obtaining unit 102 obtains attribute information of each individual object in the real space in which the user is located (S101).

Subsequently, the information obtaining unit 102 obtains the received content information (S103).

Subsequently, the information obtaining unit 102 obtains the received user information. It should be noted that the user information can include user's body information (S105).

Subsequently, the server 10 performs "processing of determining a movable space" described later (S107).

After that, the output control unit 108 of the server 10 determines whether or not the user can come in contact with a boundary region of the movable space corresponding to the user determined in the S107 (S109). In a case where the user cannot come in contact with the boundary region (S109: No), the server 10 performs processing of S113 described later.

Meanwhile, in a case where the user can come in contact with the boundary region (S109: Yes), the output control unit. 108 causes the display unit 224 to display a sign indicating positional relationship between the boundary region and the user so as to be superimposed on the VR content (S111).

Subsequently, the control unit. 100 updates information required to decide a degree of danger of each individual object in the real space (S113).

After that, in a case where the user has instructed the server 10 to end the use of the VR content (S115: Yes), the process flow ends. Meanwhile, in a case where the user has not instructed the server 10 to end the use of the VR content (S115: No), the server 10 repeats the processing after the S107.

{2-2-2. Processing of Determining Movable Space}

Figure 24:
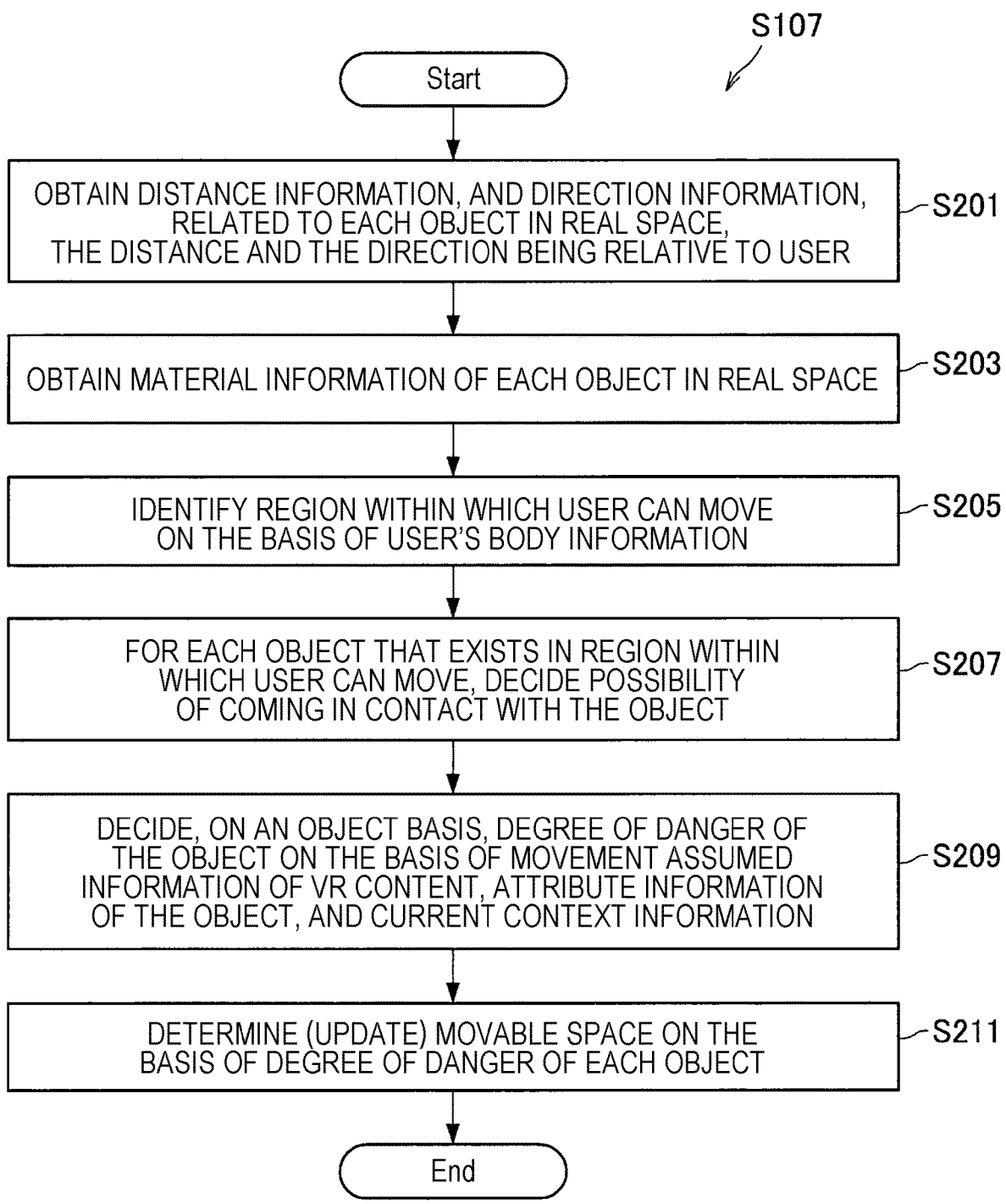
FIG. 24 is a flowchart illustrating a flow of "processing of determining a movable space" according to the embodiment.

Here, a flow of "processing of determining a movable space" in the S107 will be described in detail with reference to FIG. 24. As shown in FIG. 24, first of all, the information obtaining unit. 102 identifies distance information, and direction information, related to each individual object in the real space, on the basis of a captured image and a distance image received from the client terminal 20, the distance information and the direction information corresponding to a current position of a user (S201).

Subsequently, the information obtaining unit 102 obtains material information related to each individual object in the real space on the basis of the captured image and the distance image received from the client terminal 20 (S203). As the result of the above processing, information 44 related to surrounding objects shown in, for example, FIG. 9 is obtained.

Subsequently, the deciding unit 104 identifies a region within which a user's body can reach at a current user position (a region within which the user can move) on the basis of user's body information obtained in the S105 (S205).

Subsequently, for each object that exists in the region within which the user's body can reach, the region having been identified in the S205, the deciding unit 104 decides a possibility that the user's body will come in contact with (or collide with) the object (S207).

Subsequently, for each object that exists in the region within which the user's body can reach, the region having been identified in the S205, the deciding unit 104 decides a degree of danger of the object on the basis of movement assumed information identified by the content information obtained in the S103, attribute information of the object, and current context information (S209). Here, the attribute information of the object includes the material information obtained in the S203. In addition, the current context information can include information related to a scene that is being reproduced in VR content, a result of current action recognition of the user, and the like.

After that, the determining unit 106 determines (or updates) a range of a movable space corresponding to the user on the basis of the degree of danger of each individual object decided in the S209 (S211).

<2-3. Effects>

{2-3-1. Effect 1}

As described above, the server 10 according to the present embodiment, obtains body information of a user, and while the VR content is displayed by the display unit 224, the server 10 causes a sign indicating positional relationship between the user and the boundary region of the movable space in the real space in which the user is located, the boundary region having been determined on the basis of the body information of the user, to be displayed with the sign superimposed on the VR content. Therefore, in a scene in which the user uses the VR content, the user can be informed of the positional relationship between the boundary region of the movable space and the user. Therefore, for example, even in a case where a visual field of the user is covered by the display unit 224, the user can use the VR content safely.

{2-3-2. Effect 2}

In addition, the server 10 can determine a range of a movable space corresponding to a user on the basis of at least one of attribute information of each individual object in the real space in which the user is located, content information, and a user's action recognition result, and on the basis of the body information of the user. For example, the server 10 determines a range of a movable space in such a manner that the range becomes wider with the decrease in user's height. In addition, the server 10 determines a range of a movable space in such a manner that the range becomes wider with the decrease in speed of user's movement while the VR content is used. Moreover, in a case where a material of an object in the real space is soft, the server 10 decides that the object is a "safe" object, and determines the range of the movable space so as to include the object.

Therefore, while the safety is ensured, the range of the movable space can be determined more widely in comparison with, for example, the present comparative example. Therefore, since the flexibility of action of a user at the time of using VR content can be further increased, the user can enjoy the VR content more and more.

3. HARDWARE CONFIGURATION

Figure 25:
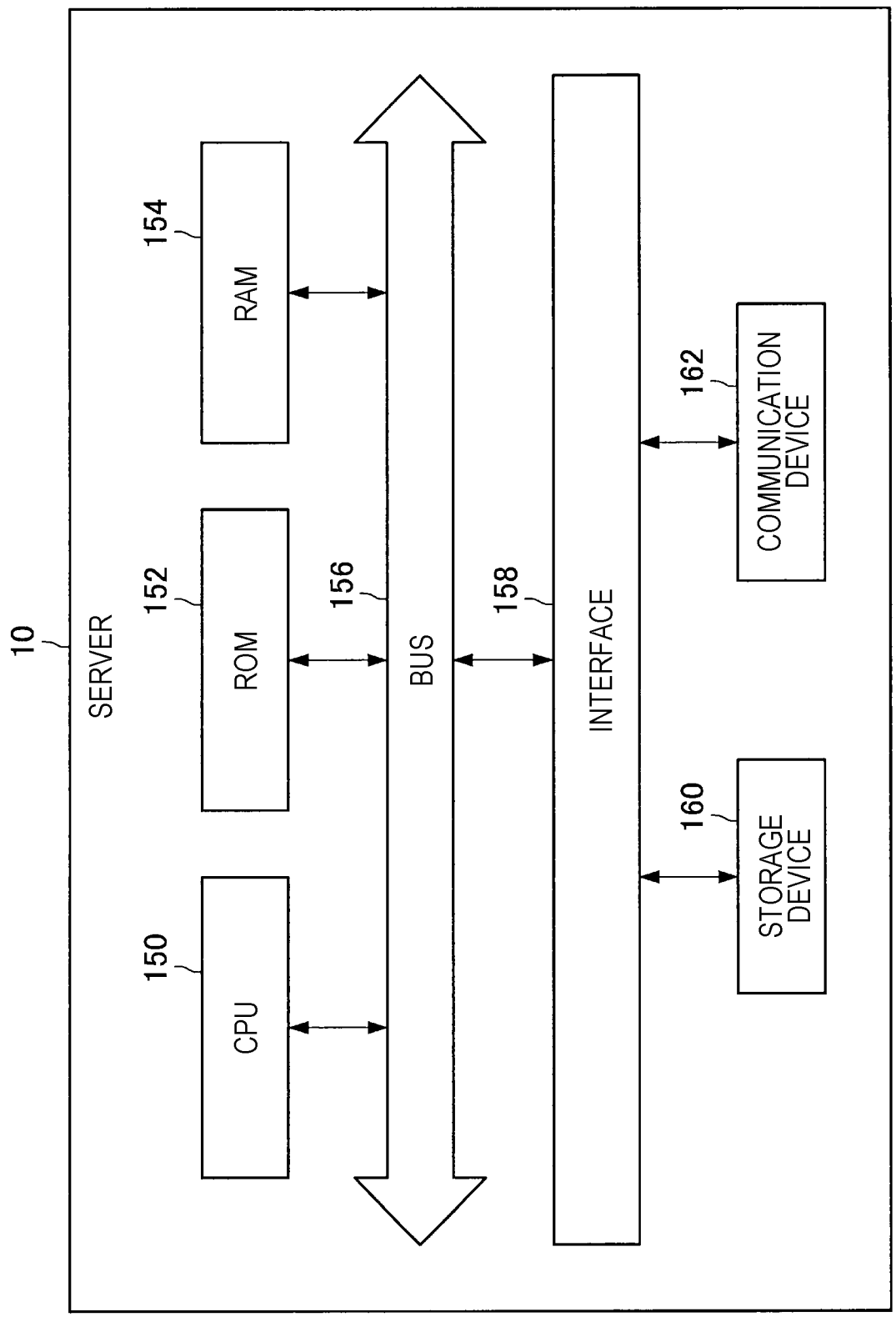
FIG. 25 is an explanatory drawing illustrating, as an example, a hardware configuration of a server 10 according to the embodiment.

Next, a hardware configuration of the server 10 according to the present embodiment will be described with reference to FIG. 25. As shown in FIG. 25, the server 10 is provided with the CPU 150, a Read Only Memory (ROM) 152, a RAM 154, a bus 156, an interface 158, the storage device 160, and the communication device 162.

The CPU 150 functions as a computation processing device and a control device, and controls the overall operation is the server 10 according to various kinds of programs. In addition, the CPU 150 realizes a function of the control unit 100 in the server 10. Incidentally, the CPU 150 is formed by a processor such as a microprocessor.

The ROM 152 stores, for example, programs used by the CPU 150, and control data such as computation parameters.

The RAM 154 temporarily stores, for example, programs executed by the CPU 150, data that is being used, and the like.

The bus 156 is formed by a CPU bus and the like. This bus 156 mutually connects the CPU 150, the ROM 152 and the RAM 154.

The interface 158 connects the storage device 160 and the communication device 162 to the bus 156.

The storage device 160 is a data storing device that functions as the storage unit 122. The storage device 160 includes, for example, a storage medium, a recording device for recording data on the storage medium, a readout device for reading data from the storage medium, a deletion device for deleting data recorded on the storage medium, or the like.

The communication device 162 is a communication interface that is used for connecting to, for example, the communication network 22 or the like, and is formed by a communication device (for example, a network card, etc.) or the like. In addition, the communication device 162 may, be a wireless LAN supported communication device, a Long Term Evolution (LIE) supported communication device, or a wired communication device that performs wired communication. This communication device 162 functions as the communication unit 120.

4. MODIFIED EXAMPLES

The preferable embodiments of the present disclosure have been described in detail as above with reference to the accompanying drawings. However, the present disclosure is not limited to the above-described examples. It is clear that persons who have ordinary skill in the technical field to which the present disclosure belongs can conceive of various correction examples or modification examples within the category of the technical idea set forth in the claims. It should be understood that, as a matter of course, these examples also belong to the technical range of the present disclosure.

4-1. Modified Example 1

For example, in the embodiments described above, the example in which the display unit 224 is a head-wearing type device has been described. However, the present disclosure is not limited to such an example. For example, the display unit 224 may be a stationary type display. It should be noted that the stationary type display can be formed by, for example, a Liquid Crystal Display (LCD), an. Organic Light Emitting Diode (OLED) or the like. In addition, the display unit 224 may be installed on a wall surface and a ceiling in a dedicated dome type facility. In this case, a user can use VR content in the facility.

Alternatively, the display unit 224 is a 3D projector. In addition, a video image may be projected on a projection target (for example, a wall, a screen or the like of the room 2) by the 3D projector.

4-2. Modified Example 2

In addition, in the embodiments described above, the example in which when a user uses VR content, the server 10 determines a movable space has been described. However, the present disclosure is not limited to such an example. The movable space can also be determined when the user uses Augmented Reality (AR) content. For example, as with the embodiment described above, when the AR content is displayed in the display unit 224, the server 10 decides a degree of danger of each individual object located in the real space in which a user is located, and thereby determines a movable space corresponding to the user. Moreover, the server 10 may cause a sign indicating positional relationship between a dangerous object (for example, a candle, an edged tool, etc.) and the user to be displayed with the sign superimposed on the AR content, or may notify the user of the existence of the dangerous object by using a sound. Incidentally, in this case, the display unit 224 can be configured as a transmission-type display device.

4-3. Modified Example 3

In addition, in the embodiments described above, the example in which the information processing device in the present disclosure is the server 10 has been described. However, the present disclosure is not limited to such an example. For example, the information processing device may be: a general-purpose Personal Computer (PC); a tablet-type terminal; a game machine; a portable telephone such as a smart phone; a portable music player; a wearable device such as, for example, a HMD; a robot; or the like.

4-4. Modified Example 4

In addition, as another modified example, the information obtaining unit 102, the deciding unit 104, the determining unit 106, and the output control unit 108 may be included in the client terminal 20 instead of being included in the server 10. In this case, the information processing device in the present disclosure may be the client terminal 20. Moreover, in this case, it is not necessary to install the server 10.

4-5. Modified Example 5

In addition, each step in the process flow according to the embodiments described above is not always required to be executed according to the above-described order. For example, each step may be executed with the order changed as appropriate. Moreover, each step may be executed partially in a parallel or individual manner instead of being executed in a time-series manner. In addition, a part of the above-described steps may be omitted, or another step may be added to the above-described steps.

Moreover, according to the above-described embodiments, a computer program that causes hardware such as the CPU 150, the ROM 152, and the RAM 154 to serve a function equivalent to that of each configuration of the server 10 according to the above-described embodiments can also be provided. Further, a recording medium having a computer program recorded thereon is also provided.

Furthermore, the effects described in the present description are to be construed as merely descriptive or illustrative, and are not limitative. In other words, the technology according to the present disclosure can achieve, together with the above effects or instead of the above effects, other effects apparent to a person skilled in the art from the statement of the present description.

It should be noted that the following configurations also belong to the technical range of the present disclosure.

(1)

An information processing device including:

an obtaining unit that obtains body information of a user; and an output control unit that, while virtual reality content is displayed by a display unit, causes a sign indicating positional relationship between the user and a boundary region of a second real space in which the user can act in a first real space in which the user is located, the boundary region having been determined on the basis of the body information of the user, to be displayed with the sign superimposed on the content.

(2)

The information processing device set forth in the preceding (1), in which a degree of danger of each of at least one object located in the first real space is decided on the basis of the body information of the user, and the boundary region of the second real space is determined on the basis of the degree of danger decided for the each of at least one object.

(3)

The information processing device set forth in the preceding (2) in which the degree of danger of the each of at least one object is decided further on the basis of a result of object recognition of the each of at least one object.

(4)

The information processing device set forth in the preceding (3), in which the degree of danger of the each of at least one object is decided further on the basis of a kind of the content.

(5)

The information processing device set forth in the preceding (3) or (4), in which the degree of danger of the each of at least one object is decided further on the basis of information of a scene that is being reproduced in the content.

(6)

The information processing device set forth in any one of the preceding (3) to (5), in which the degree of danger of the each of at least one object is decided further on the basis of a result of action recognition of the user.

(7)

The information processing device set forth in any one of the preceding (3) to (6), in which the degree of danger of the each of at least one object is decided further on the basis of an excitement degree of the user.

(8)

The information processing device set forth in any one of the preceding (3) to (7), in which the degree of danger of the each of at least one object is decided further on the basis of whether or not a captured image of the first real space is displayed by the display unit.

(9)

The information processing device set forth in any one of the preceding (3) to (8), in which the second real space is determined so as to exclude all objects, for which it has been decided that a degree of danger is higher than or equal to a predetermined threshold value, from among the at least one object.

(10)

The information processing device set forth in any one of the preceding (3) to (9), in which a position of the boundary region of the second real space is determined with reference to a position of each individual object, for which it has been decided that a degree of danger is higher than or equal to a predetermined threshold value, from among the at least one object.

(11)

The information processing device set forth in any one of the preceding (3) to (10), in which when it has been detected that a part of the user has approached the boundary region of the second real space, the output control unit causes a sign indicating the part to be displayed with the sign further superimposed on the content.

(12)

The information processing device set forth in any one of the preceding (3) to (11), in which
on the basis of a result of estimation whether or not a body of the user can come in contact with the boundary region of the second real space at a current position of the user, the output control unit causes a sign indicating positional relationship between the boundary region of the second real space and the user to be displayed with the sign superimposed on the content.

(13)

The information processing device set forth in the preceding (12), in which
in a case where it is estimated that the body of the user can come in contact with the boundary region of the second real space at the current position of the user, the output control unit causes a sign indicating positional relationship between the boundary region of the second real space and the user to be displayed with the sign superimposed on the content, and
in a case where it is estimated that the body of the user cannot come in contact with the boundary of the second real space at the current position of the user, the output control unit does not cause a sign indicating positional relationship between the boundary region of the second real space and the user to be displayed by the display unit.

(14)

The information processing device set forth in any one of the preceding (3) to (13), in which
the second real space is determined so as to include at least one of all objects, for which it has been decided that a degree of danger is lower than a predetermined threshold value, from among the at least one object, and
before the timing in which it is predicted that the body of the user comes in contact with at least one object located in the second real space, the output control unit further changes a display mode of a predetermined virtual object in the content.

(15)

The information processing device set forth in any one of the preceding (3) to (14), in which
the second real space is determined so as to include at least one of all objects, for which it has been decided that, a degree of danger is lower than a predetermined threshold value, from among the at least one object, and
when it has been detected that the body of the user has come in contact with at least one object located in the second real space, the output control unit further causes a sign indicating the contact to be displayed at a position that is associated with a predetermined virtual object in the content.

(16)

The information processing device set forth in any one of the preceding (3) to (15), further including:
a deciding unit that decides a degree of danger of the each of at least one object on the basis of the body information of the user; and
a determining unit that determines a boundary region of the second real space on the basis of a result of deciding by the deciding unit.

(17)

The information processing device set forth in any one of the preceding (3) to (16), in which
the body information of the user includes a height of the user, and/or an arm's length of the user.

(18)

The information processing device set forth in any one of the preceding (3) to (17), in which
the display unit is a wearable device worn by the user.

(19)

An information processing method including:
obtaining body information of a user; and
while virtual reality content is displayed by a display unit, causing, by a processor, a sign indicating positional relationship between the user and a boundary region of a second real space in which the user can act in a first real space in which the user is located, the boundary region having been determined on the basis of the body information of the user, to be displayed with the sign superimposed on the content.

(20)

A program causing a computer to function as:
an obtaining unit that obtains body information of a user; and
an output control unit that, while virtual reality content is displayed by a display unit, causes a sign indicating positional relationship between the user and a boundary region of a second real space in which the user can act in a first real space in which the user is located, the boundary region having been determined on the basis of the body information of the user, to be displayed with the sign superimposed on the content.

REFERENCE SIGNS LIST

10 Server
20 Client terminal
22 Communication network
100, 200 Control unit.
102 Information obtaining unit
104 Deciding unit
106 Determining unit
108 Output control unit
120, 220 Communication unit
122, 230 Storage unit
202 Sensing-result obtaining unit
204 Content information obtaining unit
206 Context information obtaining unit
208 Terminal information obtaining unit
210 User information obtaining unit
222 Input unit
224 Display unit
226 Audio output unit
228 Sensor unit

The invention claimed is:

1. An information processing device comprising:
an obtaining unit configured to obtain body information of a user; and
an output control unit configured to, while virtual reality content is displayed by a display unit, cause a sign indicating positional relationship between the user and a boundary region of a second real space in which the user can act in a first real space in which the user is located, the boundary region having been determined on a basis of the body information of the user, to be displayed with the sign superimposed on the virtual reality content,
wherein the second real space is determined so as to include at least one of all objects, for which it has been decided that a degree of danger is lower than a predetermined threshold value, from among at least one object located in the first real space, and
wherein the obtaining unit and the output control unit are each implemented via at least one processor.

2. The information processing device according to claim 1, wherein
a degree of danger of each of the at least one object located in the first real space is decided on a basis of the body information of the user, and
the boundary region of the second real space is determined on a basis of the degree of danger decided for the each of at least one object.

3. The information processing device according to claim 2, wherein
the degree of danger of the each of at least one object is decided further on a basis of a result of object recognition of the each of at least one object.

4. The information processing device according to claim 3, wherein
the degree of danger of the each of at least one object is decided further on a basis of a kind of the virtual reality content.

5. The information processing device according to claim 3, wherein
the degree of danger of the each of at least one object is decided further on a basis of information of a scene that is being reproduced in the virtual reality content.

6. The information processing device according to claim 3, wherein
the degree of danger of the each of at least one object is decided further on a basis of a result of action recognition of the user.

7. The information processing device according to claim 3, wherein
the degree of danger of the each of at least one object is decided further on a basis of an excitement degree of the user.

8. The information processing device according to claim 3, wherein
the degree of danger of the each of at least one object is decided further on a basis of whether or not a captured image of the first real space is displayed by the display unit.

9. The information processing device according to claim 3, wherein
the second real space is determined so as to exclude all objects, for which it has been decided that a degree of danger is higher than or equal to a predetermined threshold value, from among the at least one object.

10. The information processing device according to claim 3, wherein
a position of the boundary region of the second real space is determined with reference to a position of each individual object, for which it has been decided that a degree of danger is higher than or equal to a predetermined threshold value, from among the at least one object.

11. The information processing device according to claim 3, wherein
when it has been detected that a part of the user has approached the boundary region of the second real space, the output control unit is further configured to cause a sign indicating the part to be displayed with the sign further superimposed on the virtual reality content.

12. The information processing device according to claim 3, wherein
on a basis of a result of estimation whether or not a body of the user can come in contact with the boundary region of the second real space at a current position of the user, the output control unit is further configured to cause a sign indicating positional relationship between the boundary region of the second real space and the user to be displayed with the sign superimposed on the virtual reality content.

13. The information processing device according to claim 12, wherein
in a case where it is estimated that the body of the user can come in contact with the boundary region of the second real space at the current position of the user, the output control unit is further configured to cause a sign indicating positional relationship between the boundary region of the second real space and the user to be displayed with the sign superimposed on the virtual reality content, and
in a case where it is estimated that the body of the user cannot come in contact with the boundary region of the second real space at the current position of the user, the output control unit is further configured to not cause a sign indicating positional relationship between the boundary region of the second real space and the user to be displayed by the display unit.

14. The information processing device according to claim 3, wherein
before a timing in which it is predicted that a body of the user comes in contact with at least one object located in the second real space, the output control unit is further configured to change a display mode of a predetermined virtual object in the virtual reality content.

15. The information processing device according to claim 3, wherein
when it has been detected that a body of the user has come in contact with at least one object located in the second real space, the output control unit is further configured to cause a sign indicating the contact to be displayed at a position that is associated with a predetermined virtual object in the virtual reality content.

16. The information processing device according to claim 3, further comprising:
a deciding unit configured to decide a degree of danger of the each of at least one object on a basis of the body information of the user; and
a determining unit configured to determine a boundary region of the second real space on a basis of a result of deciding by the deciding unit,
wherein the deciding unit and the determining unit are each implemented via at least one processor.

17. The information processing device according to claim 3, wherein
the body information of the user includes a height of the user, and/or an arm's length of the user.

18. The information processing device according to claim 3, wherein
the display unit is a wearable device worn by the user.

19. An information processing method comprising:
obtaining body information of a user; and
causing, while virtual reality content is displayed by a display unit, by a processor, a sign indicating positional relationship between the user and a boundary region of a second real space in which the user can act in a first real space in which the user is located, the boundary region having been determined on a basis of the body information of the user, to be displayed with the sign superimposed on the virtual reality content,
wherein the second real space is determined so as to include at least one of all objects, for which it has been decided that a degree of danger is lower than a predetermined threshold value, from among at least one object located in the first real space.

20. A non-transitory computer-readable medium having embodied thereon a program, which when executed by a computer causes the computer to execute an information processing method, the method comprising:

obtaining body information of a user; and causing, while virtual reality content is displayed by a display unit, a sign indicating positional relationship between the user and a boundary region of a second real space in which the user can act in a first real space in which the user is located, the boundary region having been determined on a basis of the body information of the user, to be displayed with the sign superimposed on the virtual reality content, wherein the second real space is determined so as to include at least one of all objects, for which it has been decided that a degree of danger is lower than a predetermined threshold value, from among at least one object located in the first real space.

* * * * *